US010133542B2

(12) United States Patent
Bowling

(10) Patent No.: US 10,133,542 B2
(45) Date of Patent: Nov. 20, 2018

(54) MODIFICATION OF DISTRACTING SOUNDS

(71) Applicant: Google Inc., Mountain View, CA (US)

(72) Inventor: Zaccariah Bowling, San Francisco, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/392,732

(22) Filed: Dec. 28, 2016

(65) Prior Publication Data
US 2018/0181366 A1 Jun. 28, 2018

(51) Int. Cl.
H04R 29/00 (2006.01)
G06F 3/16 (2006.01)
H04R 3/04 (2006.01)
G10L 19/018 (2013.01)

(52) U.S. Cl.
CPC ............ G06F 3/165 (2013.01); G10L 19/018 (2013.01); H04R 3/04 (2013.01); H04R 29/001 (2013.01)

(58) Field of Classification Search
CPC ......... G06F 3/165; G10L 19/018; H04R 3/04; H04R 29/001
USPC .......................................................... 381/58
See application file for complete search history.

(56) References Cited

U.S. PATENT DOCUMENTS

| 6,829,582 B1 | 12/2004 | Barsness |
| 9,047,371 B2 | 6/2015 | Mohajer et al. |
| 9,780,816 B1* | 10/2017 | Elenes .................... H04B 1/10 |
| 2001/0046304 A1 | 11/2001 | Rast |
| 2011/0142257 A1 | 6/2011 | Goodwin et al. |
| 2013/0163781 A1* | 6/2013 | Thyssen .................. H04R 3/007 381/94.3 |
| 2014/0301556 A1 | 10/2014 | Wang et al. |
| 2016/0062995 A1* | 3/2016 | Ng ..................... G06F 17/30044 707/723 |
| 2016/0093316 A1* | 3/2016 | Paquier ................... G10L 25/48 704/278 |
| 2016/0316293 A1 | 10/2016 | Klimanis et al. |

FOREIGN PATENT DOCUMENTS

CA 2621952 A1 9/2009

OTHER PUBLICATIONS

International Search Report and Written Opinion of International Application No. PCT/US2017/054157, dated Dec. 27, 2017, 9 pp.
Response to Written Opinion dated Dec. 27, 2017, from International Application No. PCT/US2017/054157, dated Jun. 1, 2018, 22 pp.

* cited by examiner

Primary Examiner — Quynh Nguyen
(74) Attorney, Agent, or Firm — Shumaker & Sieffert, P.A.

(57) ABSTRACT

A system comprising at least one processor; and at least one storage device. The storage device(s) store instructions that, when executed, cause the at least one processor to: prior to enabling output of an audio signal based on an audio data stream, detect, within the audio data stream, an indication of a target sound that corresponds to one of a plurality of sounds that are expected to cause distraction, replace, within the audio data stream, the indication of the target sound with an indication of a replacement sound, wherein the replacement sound is a less distracting version of the target sound, and after replacing the indication of the target sound with the indication of the replacement sound, output the audio data stream.

20 Claims, 7 Drawing Sheets

MODIFICATION OF DISTRACTING SOUNDS

BACKGROUND

Sounds play an important role in notifying or alerting users. A smoke alarm warns of a potential fire. A siren or a car horn warns drivers of a potential road hazard. A mobile phone ringtone notifies a user that an incoming call is being received. Such sounds are designed to distract and divert attention to a potentially important event or condition. In some cases, however, similar warning or alerting sounds, when generated by a television, radio, communications device, or computing device as part of an audio and/or multimedia broadcast, might inappropriately cause distraction. For example, a driver of an automobile may be confused as to whether the sound of a police siren originates from inside or outside the automobile when the sound of the siren is being output by the car radio as part of a radio broadcast.

SUMMARY

This disclosure is directed to techniques that include processing an audio data stream and performing an operation or adjustment so that potentially distracting or confusing sounds that would otherwise be output as audible content produced from the audio data stream are modified or removed. For example, a car horn sound in an audio signal generated by a radio may be distracting to a driver of an automobile because the driver could mistakenly believe that the source of the car horn is a nearby automobile. Accordingly, an example computing device may, prior to outputting audible content produced from an audio data stream received by a radio in an automobile, perform an operation or adjustment to prevent the distracting sound (e.g., a car horn sound) from being heard when the audio data stream is output as audible content.

In some examples, the operation may involve modifying the audio data stream by replacing portions of audio data that are associated with distracting sounds with audio data that represents an alternate sound. In other examples, the operation or adjustment may involve modifying or changing an audio output device that produces audible content from the audio data stream so that when the audio output device produces audible content from the data that represents the distracting sounds, the audible content is modified, so that the resulting sound is no longer distracting. In some examples, the alternate sound may be recognizable as the original sound, but may be sufficiently different than the original sound to avoid distracting the driver. Accordingly, an example computing device may modify sounds produced from an audio data stream by modifying the data underlying the audio data stream, by modifying the manner in which the audio data stream is produced as an audio signal, or in another manner.

An example computing device may identify portions of audio data that are associated with distracting or confusing sounds through an audio fingerprinting algorithm that compares indications of sounds in the audio data stream to indications of sounds in a data store of potentially distracting or confusing sounds. The computing device may determine a context in which the computing device is being used, and may determine, based on the context and the results of the audio fingerprinting algorithm, whether one or more sounds included within an audio data stream are likely to be distracting. For example, a car horn sound originating from a car radio may be distracting to a driver of a moving automobile, but that same sound, if generated by a sound system in a movie theatre, might not be distracting to a person watching the movie in the theatre.

In one example, a method comprises: prior to enabling output of an audio signal based on an audio data stream, detecting, by a computing device, within the audio data stream, an indication of a target sound that corresponds to one of a plurality of sounds that are expected to cause distraction; performing, by the computing device, an operation to prevent the audio signal based on the audio data stream from including the target sound; and after performing the operation, outputting, by the computing device, the audio data stream.

In another example, a system comprises: at least one processor; and at least one storage device that stores instructions that, when executed, configure the at least one processor to: prior to enabling output of an audio signal based on an audio data stream, detect, within the audio data stream, an indication of a target sound that corresponds to one of a plurality of sounds that are expected to cause distraction, replace, within the audio data stream, the indication of the target sound with an indication of a replacement sound, wherein the indication of the replacement sound is a modified version of the indication of the target sound to prevent distraction, and after replacing the indication of the target sound with the indication of the replacement sound, output the audio data stream.

In another example, a computer-readable storage medium comprises instructions that, when executed, configure at least one processor of a computing system to: prior to outputting an audio signal based on an audio data stream, detect, within the audio data stream, an indication of a target sound that corresponds to one of a plurality of sounds that are expected to cause distraction to a driver of an automobile; detect movement of the computing device that is consistent with movement of the computing device within the automobile; responsive to detecting movement that is consistent with movement of the computing device within the automobile, replace, within the audio data stream, the indication of the target sound with an indication of a replacement sound, wherein the indication of the replacement sound is a modified version of the indication of the target sound to prevent distraction; and after replacing the indication of the target sound with the indication of the replacement sound, output the audio signal based on the audio data stream.

DETAILED DESCRIPTION

Figure 1:
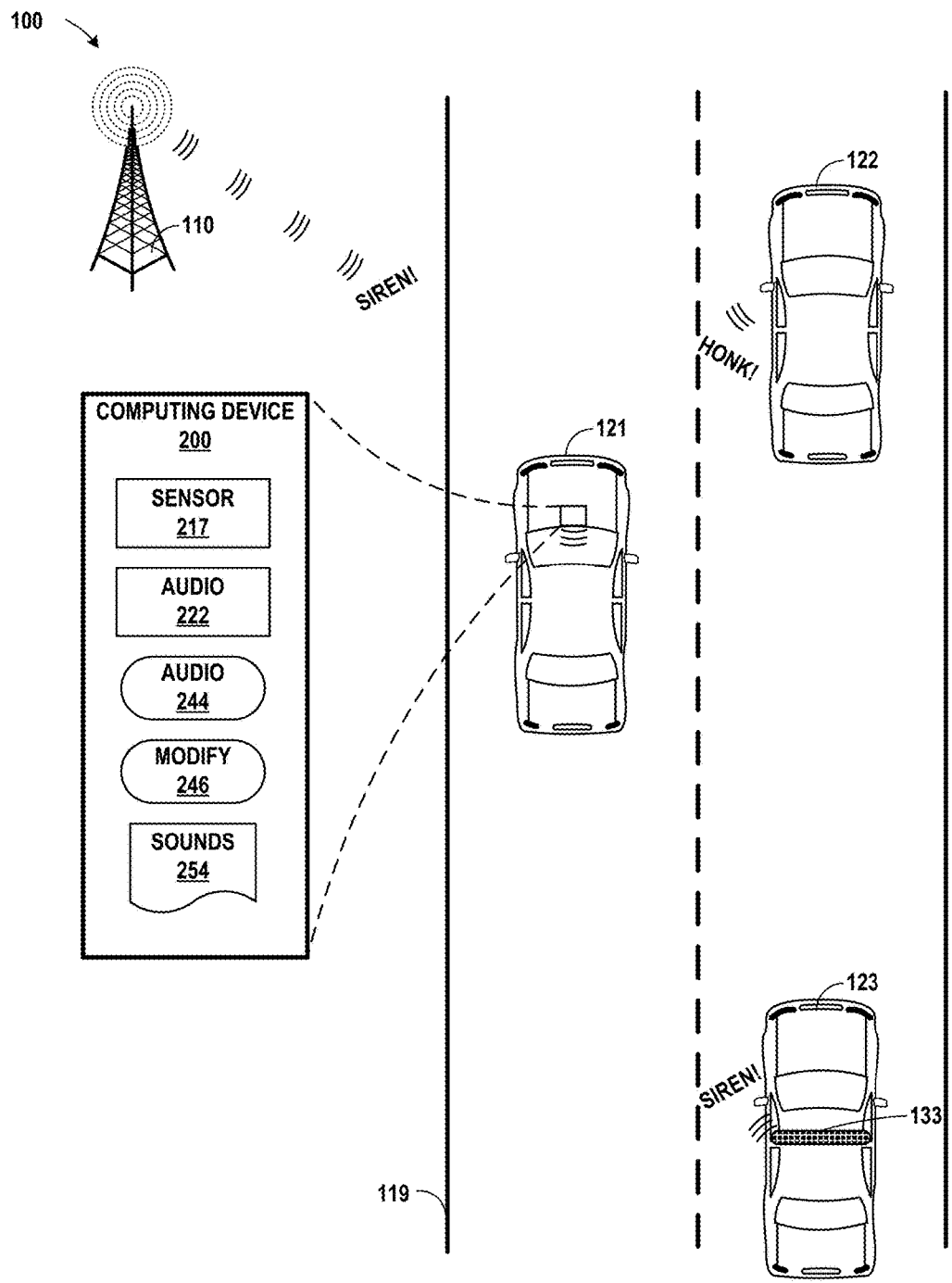
FIG. 1 is a conceptual diagram illustrating an example system that is configured to process an audio data stream to modify one or more distracting, confusing, startling, or other sounds represented by data within the audio data stream, in accordance with one or more aspects of the present disclosure.

FIG. 1 is a conceptual diagram illustrating an example system that is configured to process an audio data stream to modify one or more distracting, confusing, startling, or other sounds represented by data within the audio data stream, in accordance with one or more aspects of the present disclosure. FIG. 1 illustrates a top view of road 119 on which automobile 121, automobile 122, and police automobile 123 are traveling. Broadcast tower 110 broadcasts a signal that may be received by one or more devices, such as a radio within one or more of automobile 121, automobile 122, and police automobile 123 (collectively "automobiles 120"). Each of automobiles 120 may be capable of making various sounds, such as a car horn sound. Other sounds may emanate from one or more of automobiles 120, such as squealing tires, a loud engine, wind noise, or the voice of an angry motorist. In the example of FIG. 1, police automobile 123 includes siren and accompanying rooftop flashing lights 133, and police automobile 123 is capable of generating a siren sound. Police automobile 123 may also include a loudspeaker. FIG. 1 illustrates one example implementation of system 100. Other example implementations of system 100 may be appropriate in other instances. Such implementations may include a subset of the devices or components included in the example of FIG. 1 and/or may include additional devices and/or components not shown in FIG. 1.

In the example of FIG. 1, automobile 121 includes computing device 200, which may be implemented as any suitable computing system, and may be installed within automobile 121. Computing device 200 may be a mobile device that has been placed within automobile 121. Computing device 200 may be a wearable computing device. Computing device 200 may be a non-mobile device mounted within a dashboard, passenger seat head rest, or other component of automobile 121.

Although computing device 200 may be a stand-alone device, computing device 200 may, generally, take any of a number of different forms. For example, computing device 200 may be, or may be part of, any component, device, or system that includes a processor or other suitable computing environment for processing information or executing software instructions. In some examples, computing device 200 may serve as a computing device that enables a user to interact with, browse, and/or use information or resources available over a network. For instance, computing device 200 may be part of a vehicle computing system that may operate to assist, inform, entertain, or perform other tasks. Computing device 200 may be referred to as a vehicle head unit, an infotainment system, or a subcomponent thereof.

Further, although computing device 200 may be described in FIG. 1 as being implemented in an automobile, computing device 200 may be implemented in a variety of contexts, as further described herein. For example, computing device 200 may be or may be implemented as part of a smartphone, a video conferencing system, audio headphones or other audio output devices, a voice assistant device, and/or other devices or systems.

Computing device 200 may represent a computing device that performs operations described herein as the result of instructions, stored on a computer-readable storage medium, executing on one or more processors. The instructions may be in the form of software stored on one or more local or remote computer readable storage devices. In other examples, computing device 200 may perform operations using hardware, firmware, or a mixture of hardware, software, and firmware residing in and/or executing at computing device 200.

Computing device 200 may include one or more sensor devices 217, one or more audio output devices 222, audio processing module 244, sound modification module 246, and sounds data store 254.

One or more sensor devices 217 may include any of a variety of types of sensors. For example, sensor devices 217 may include an accelerometer that generates accelerometer data. Accelerometer data may indicate an acceleration and/or a change in acceleration of computing device 200 (e.g., within automobile 121). Sensor devices 217 may include one or more location sensors capable of determining information about the location of computing device 200. Sensor devices 217 may include one or more GPS devices that use satellite data to calculate a global position. In other examples, sensor devices 217 may alternatively, or in addition, use information from cell towers, Wi-Fi networks, or other network information to triangulate location information or approximate location information. Sensor devices 217 may output location information or indications of location information reflecting one or more locations at which computing device 200 is be positioned or located. Sensor devices 217 may include a gyrometer that generates gyrometer data. Gyrometer data may indicate a physical orientation and/or change in physical orientation of computing device 200. In some examples, the orientation may be relative to one or more reference points. Sensor devices 217 may include a magnetometer that generates magnetometer data. Magnetometer data may indicate the magnetization of an object that is touching or in proximity to computing device 200. Magnetometer data may indicate the Earth's magnetic field, and in some examples, provide directional functionality of a compass. Sensor devices 217 may include an ambient light sensor that generates ambient light data. The ambient light data may indicate an intensity of light to which computing device 200 is exposed. Sensor devices 217 may include a proximity sensor that generates proximity data. Proximity data may indicate whether an object is within proximity to computing device 200. In some examples, proximity data may indicate how close an object is to computing device 200. In some examples, sensor devices 217 may include a clock that generates a date and time. The date and time may be a current date and time. Sensor devices 217 may include temperature sensor that measures ambient temperature in proximity to sensor devices 217. The ambient temperature may indicate an intensity of temperature.

One or more audio output devices 222 may include an electroacoustic transducer, and/or may otherwise operate to convert an electrical signal into a corresponding sound. In some examples, audio output device 222 may comprise a loudspeaker or speaker housed in an enclosure configured to enhance the quality of the sound. In other examples, audio output device 222 may comprise a loudspeaker or speaker built into a housing of computing device 200, or may comprise a loudspeaker or speaker built into a set of wired or wireless headphones that may be or may be capable of being operably coupled to computing device 200.

One or more audio output devices 222 may be capable of selectively performing an adjustment in response to input that causes audio output devices 222 to produce a sound in a different or modified way. For example, an audio output device 222 may receive an audio data stream, or a portion of data from an audio data stream, and cause an audio signal (i.e., audible content) to be produced that is modified in some way relative to the sound that would otherwise be produced from the audio data stream or the portion of data from the audio data stream. For example, the audio output device may selectively produce a tone-shifted version of the original sound corresponding to the audio data stream, or may produce a version of the original sound with the bass or other aspect of the sound removed or altered Audio processing module 244 may generally perform functions relating to processing audio signals and converting such signals into sounds. Audio processing module 244 may receive an indication of an analog or digital signal received over the air or via a network, and may process the signal to determine an audio data stream encoded in, included within, or otherwise represented by the signal. Accordingly, audio processing module 244 may convert the signal into a sequence of bits (e.g., the audio data stream) that corresponds to the signal. Audio processing module 244 may process a digital audio data stream, convert the digital audio data stream into a format suitable for an audio output device (e.g., as an analog signal), and output the signal to the audio output device, which converts the data into audible sounds.

Audio processing module 244 may perform functions relating to detecting sounds within an audio data stream. Audio processing module 244 may apply an audio fingerprint or matching algorithm to identify data within an audio data stream that corresponds to one or more sounds that may be distracting, confusing, startling, or otherwise a candidate for modification (e.g., "target sounds"). Audio processing module 244 may access sound information stored in sounds data store 254, and compare data in an audio data stream to data stored in sounds data store 254. In some examples, audio processing module 244 may be configured to detect sounds algorithmically based on characteristics of the sound, without applying a matching algorithm. Audio processing module 244 may determine a context in which sounds are expected to be heard, and use the context to identify data corresponding to sounds that are likely to cause distraction or confusion.

Audio processing module 244 may output, to sound modification module 246, information about an audio data stream and/or data within the audio data stream that represents sounds. In response, audio processing module 244 may receive, from sound modification module 246, a modified data stream with data corresponding to one or more distracting sounds modified, replaced, or removed from the audio data stream. Alternatively, audio processing module 244 may control an audio output device (e.g., audio output device 222) so that when the audio output device produces audible content corresponding to data associated with a distracting, confusing, startling, or other sounds, the audio output device modifies the manner in which the audible content is produced so that the distracting or confusing sound has a different audible character than the original sound.

Sound modification module 246 may generally perform functions relating to modifying data associated with sounds within an audio data stream. For example, sound modification module 246 may receive from audio processing module 244 information about an audio data stream and/or information about data corresponding to sounds included within the data stream. Audio processing module 244 may also receive information indicating how data corresponding to sounds within the audio data stream could be or should be replaced or modified. Sound modification module 246 may analyze the audio data stream or other information received and replace or modify some or all of the data within the audio data stream, so that audible content produced from the modified audio data stream includes alternate sounds in place of one or more distracting or confusing sounds. Alternate sounds may be recognizable as a replacement to a corresponding distracting sound, and may be similar to the distracting sound, but may be sufficiently different so that the sound is less likely to be heard as distracting or confusing. In some examples, the alternate sound may be a tone-shifted version of the original sound, or may be a version of the original sound with the bass or other aspect of the sound removed or altered. Sound modification module 246 may output to audio processing module 244 a modified audio data stream, or in some examples, may output an audio signal corresponding to the modified audio data stream.

Sounds data store 254 may represent any suitable storage medium for storing information that includes data corresponding to potentially distracting, confusing, startling, or surprising audio sounds, and/or contexts or situations in which such sounds may occur. The information stored in sounds data store 254 may be searchable and/or categorized such that one or more modules within computing device 200 may provide an input requesting information from sounds data store 254, and in response to the input, receive information stored within sounds data store 254. Sounds data store 254 may be primarily maintained by audio processing module 244 and may store sound information or data corresponding to sounds for multiple situations. Sounds data store 254 may receive sound information or data corresponding to sounds from sounds data store 354 over network 150. Sounds data store 254 may provide other modules with access to the data stored within sounds data store 254, and/or may analyze the data stored within sounds data store 254 and output such information on behalf of other modules of computing device 200.

Modules illustrated in FIG. 1 and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

In the example of FIG. 1, and in accordance with one or more aspects of the present disclosure, computing device 200 may analyze a signal received from broadcast tower 110 (which in other examples may be a satellite, building, or other signal source) while computing device 200 is within moving automobile 121. For example, audio processing module 244 of computing device 200 may determine that computing device 200 is traveling within an automobile, such as automobile 121, based on information received from sensor device 217. That is, sensor device 217 of computing device 200 may detect movement and output information as one or more indications of movement to audio processing module 244. Audio processing module 244 may determine, based on the one or more indications of movement, that computing device 200 is moving. Audio processing module 244 may further determine, based on the one or more indications of movement, that is traveling within an automobile (e.g., automobile 121). By determining that computing device 200 is traveling within an automobile, audio processing module 244 may establish a context for determining sounds that may cause distraction or confusion. For instance, and as further described herein, determining whether a given sound will be distracting to a user of computing device 200 may depend on the context in which computing device 200 is being used (e.g., a sound that might be considered distracting when the context is an automobile may or may not be distracting when the context is a home or work location). Accordingly, audio processing unit 244 may perform some processing operations based at least in part on information about the context in which computing device 200 is being used.

Computing device 200 may tune to a channel or frequency associated with a radio station. For example, user interface device 211 of computing device 200 may detect input that it determines corresponds to a request to tune to a specific channel or frequency, such as a satellite radio channel or a frequency at which a local radio station broadcasts. In response, computing device 200 may monitor signals at that channel or frequency. Computing device 200 may detect a signal broadcast by broadcast tower 100 at the tuned channel or frequency, and output to audio processing module 244 an indication of the detected signal. Audio processing module 244 may determine that the signal includes an audio data stream.

Computing device 200 may determine whether the audio data stream includes an indication of a sound corresponding to those included in sounds data store 254. For example, audio processing module 244 may compare indications of sounds included within the audio data stream to indications of sounds stored within sounds data store 254. Audio processing module 244 may perform such a comparison over a period of time sufficient to determine whether sounds included within the detected signals match or do not match sounds within sounds data store 254. In some examples, audio processing module 244 may buffer data within the audio data stream so that a matching and/or audio fingerprint algorithm may be applied using indications of sounds within sounds data store 254. In some examples, audio processing module 244 may buffer data or sounds over a timeframe of approximately one to three seconds while applying an audio fingerprinting algorithm. Other shorter or longer timeframes may be employed in other examples.

Computing device 200 may determine that the audio data stream does not include data corresponding to distracting sounds. For example, audio processing module 244 may determine, based on results of a matching algorithm applied to sound data included within sounds data store 254, that the audio data stream does not include data matching or otherwise corresponding to sound data included in sounds data store 254. Audio processing module 244 may cause user interface module 241 to output an audio signal through audio output device 222 corresponding to the audio data stream derived from the signal broadcast by broadcast tower 110. In such an example, computing device 200 may refrain from modifying the audio data stream, and may output, without modification, the audio signal corresponding to the signal received from broadcast tower 110. The audio signal output by audio output device 222 may include audio from a radio or other type of broadcast, and may include music, conversation, advertisements, or other content.

Computing device 200 may output an audio signal having a delay. For example, audio output device 222 may output the audio signal with a delay relative to the detection, by computing device 200, of the signal broadcast by broadcast tower 110. For instance, an audio signal may be delayed by an amount of time approximately equal to or greater than the time period needed to determine whether an indication of a sound included within the audio data stream matches or does not match an indication of a sound within sounds data store 254. The amount of time associated with the delay may be on the order of one or more microseconds, milliseconds, or seconds.

Computing device 200 may detect further signals, and may determine that an audio data stream includes an indication of a distracting sound. For example, computing device 200 may detect further signals broadcast by broadcast tower 110, and output to audio processing module 244 indications of the detected signals. Audio processing module 244 may determine that the signals include an audio data stream. Audio processing module 244 may determine whether the audio data stream includes one or more indications of sounds corresponding to indications of sounds within sounds data store 254. Audio processing module 244 may compare indications of sounds included within the audio data stream to indications of sounds within sounds data store 254 over a period of time sufficient to determine whether the sounds within the audio data stream match or do not match indications of sounds within sounds data store 254. Audio processing module 244 may buffer detected signals so that a matching and/or audio fingerprint algorithm may be applied. Audio processing module 244 may determine that the audio data stream includes data representing a siren sound that may be similar to a siren sound generated by a police car, such as police automobile 123.

Computing device 200 may modify the audio data stream and output an audio signal corresponding to the modified audio data stream without the siren sound. For example, audio processing module 244 may output to sound modification module 246 information about the siren sound, the audio data stream, and/or information about the audio data stream. Sound modification module 246 may modify the audio data stream, replacing the data associated with the siren sound with data associated with an alternate sound. Sound modification module 246 may output to audio processing module 244 the modified audio data stream. Audio processing module 244 may cause computing device 200 to output an audio signal through audio output device 222 corresponding to the modified audio data stream, so that the resulting audible content includes the alternate sound in place of the siren sound.

Computing device 200 may control an audio output device and output an audio signal corresponding to the audio data stream without the siren sound. For example, audio processing module 244 may cause computing device 200 to output an audio signal through audio output device 222 corresponding to the unmodified audio data stream. Audio processing module 244 may control the audio output device 222 so that when the audio output device 222 generates audible content corresponding to the data within the audio data stream that is associated with the siren sound, the audio output device 222 produces an alternate sound. In some examples, the alternate sound may result from the audio output device 222 producing an audio signal with one or more different effects. For example, the audio output device 222 may adjust the volume, and/or manner and degree to which sounds at certain frequencies are produced or translated into an audio signal, so that the resulting sound is a noticeably different version of the siren sound. In other examples, audio output device 222 might not reproduce sounds in a band of low frequencies for portions of the audio data stream corresponding to the potentially distracting sounds. Such effects may alter the potentially distracting sound to a degree that is sufficient to avoid distraction. In other examples, audio processing module 244 may selectively output portions of an audio data stream to one audio output device 222 in some instances, and may output other portions of an audio data stream (e.g., those portions identified as corresponding to distracting sounds) to another significantly different audio output device 222.

The alternate version of the siren sound may be produced by modifying the data within the audio data stream, by modifying the manner in which an audio output device produces an audio signal from the audio data stream, by modifying the data stream and modifying the manner of the output, or in another way. However modified, the alternate sound may be recognizable as a replacement to the distracting sound. For example, the alternate sound may be similar to the siren sound, but may be sufficiently different from the siren so that it is less likely to distract the driver (or other occupant of automobile 121) because the driver may be able to distinguish the alternate sound from that which the driver might expect to originate from police automobile 123. For example, the alternate sound may be a tone-shifted version of the original siren sound, or may be a version of the siren sound that has the bass or other aspects of the siren sound removed or altered. Accordingly, the alternate sound may be less likely to distract or confuse the driver. Further, in some examples, rather than causing an alternate sound to be heard in place of the siren sound, audio processing module 244 may cause audio output device 222 to refrain from outputting any audible sound corresponding to the data within the audio data stream that is associated with the siren sound.

As a result, computing device 200 may avoid distracting the driver (or other occupant of automobile 221). That is, if audio output device 222 were to output, within automobile 121, the audible siren sound produced from the audio data stream received by computing device 200, the driver may mistakenly believe that the siren sound originated from police automobile 123. The driver of automobile 121 may be confused, startled, and/or distracted. This might cause the driver to operate automobile 121 in an inappropriate or unsafe manner, or in a manner that is dangerous or confusing to one or more automobiles 120 on road 119. By preventing the siren sound from being heard, such distraction and/or confusion is prevented.

Computing device 200 may determine whether computing device 200 is moving in a manner consistent with traveling in an automobile before modifying and/or outputting the audio data stream and/or audible content. In some examples, audio processing module 244 might not modify the audio data stream or perform adjustments to an audio output device if the context is such that the siren sound is not likely to startle, cause distraction, cause confusion, or present a safety hazard. For example, if computing device 200 determines that it is not traveling in an automobile or other vehicle, audio processing module 244 might not attempt to determine whether the audio data stream includes an indication of a siren sound or one or more other distracting sounds. In other examples, computing device 200 may otherwise determine that the situation or context suggests that a siren sound is not likely to be distracting. In such an example, audio processing module 244 might attempt to determine whether the audio data stream includes an indication of a different sound that is distracting for the given situation or context.

In some examples, computing device 200, whether in automobile 121 or located elsewhere, may detect within an audio data stream data that corresponds to sounds that distract, change, or heighten a user's attention, surprise a user, startle a user, or otherwise cause a user to alter or heighten his or her attention in a given situation. In some examples, computing device 200 may detect data associated with sounds that might otherwise be confused with ambient sounds (i.e., background sounds which are present in a scene or location). For example, depending on the context, a computing device might cause confusion if it outputs an audio signal that a user mistakenly believes are ambient sounds, such as wind, water, crowds, office noises (phones ringing, copier and printer noise, fire alarms), boat, airplane traffic, or road traffic (e.g., a siren), people talking, mechanical noise (from devices such as refrigerators, air conditioners, power supplies, or motors), and bioacoustic noise (e.g., birds, crickets, barking dogs, etc.). Not all audio content that can be mistaken for ambient sounds will necessarily cause distraction, however, since sounds that cause distraction may depend to some extent on context.

For instance, in the example described in connection with FIG. 1, computing device 200 may prevent the output of an audible siren sound included as data within an audio data stream corresponding to a radio broadcast signal received by computing device 200. However, the sound of a siren as part of a movie presented within a theatre is less likely to be distracting than the same siren sound played on a car radio. Similarly, the distinctive sound of a siren generated by a police car in the United Kingdom might be distracting if heard on the radio while driving in the United Kingdom, but might not be distracting if heard on the radio while driving in the United States, where a different siren sound is more typical. Further, in most cases, the sound of a bird chirping is not likely to be considered distracting if it is included within an audio signal output by a car radio or by headphones being listened to by a person walking down the street. However, in other situations or contexts, such as within an office environment, the sound of a bird chirping might be surprising or even distracting. If detected in an audio data stream received by computing device 200, computing device 200 may prevent the output of an audible bird chirping sound in situations where that sound might be distracting or confusing. Accordingly, computing device 200 may consider the context of a situation when determining whether a given sound is likely to cause distraction. The context may include information about operations being performed by computing device 200 or capabilities of one or more nearby devices, such as sounds that such nearby devices might make, as well as the location of computing device 200, travel speed, expected destination, and/or time of day. Further, the context may include information about activities or tasks being performed by a user.

By removing or modifying data associated with various sounds within an audio data stream received by a computing device, computing device 200 may avoid distracting the driver of automobile 121. As a result, the driver of automobile 121 may drive in a safer and more effective manner because he or she is not being distracted by sounds that are misinterpreted. Accordingly, in at least some examples, techniques described in this disclosure may improve the operation of automobile 121 at least in the sense that automobile 121 is easier to drive in a safe manner.

Similarly, if computing device 200 were incorporated into other devices, such as a television (or if computing device 200 were implemented as a television), computing device 200 might avoid distracting a user watching and listening to the television. For example, when a audible sound is generated by a television that is the same as a sound that might be generated by the user's mobile phone, the user may mistakenly believe that the sound was generated by the user's mobile phone. As a result, the user might be prompted to interact with his or her mobile phone to check for emails, texts, or other notifications. By preventing the television from generating sounds that users tend to mistake for sounds made by their mobile phone, computing device 200 may cause users to be less likely to interact with their mobile phones to check for emails, texts, or other notifications while watching television. If at least some users interact with their mobile phone less often while watching television, then those mobile phones will perform less computing operations, and as a result, will consume less electrical power. Also, in at least some examples, techniques described in this disclosure may improve the operation of a device (e.g. a television) that outputs audio content to a user, because that device will provide an experience that is more likely to be free of distractions and confusing or unsettling sounds.

Figure 2:
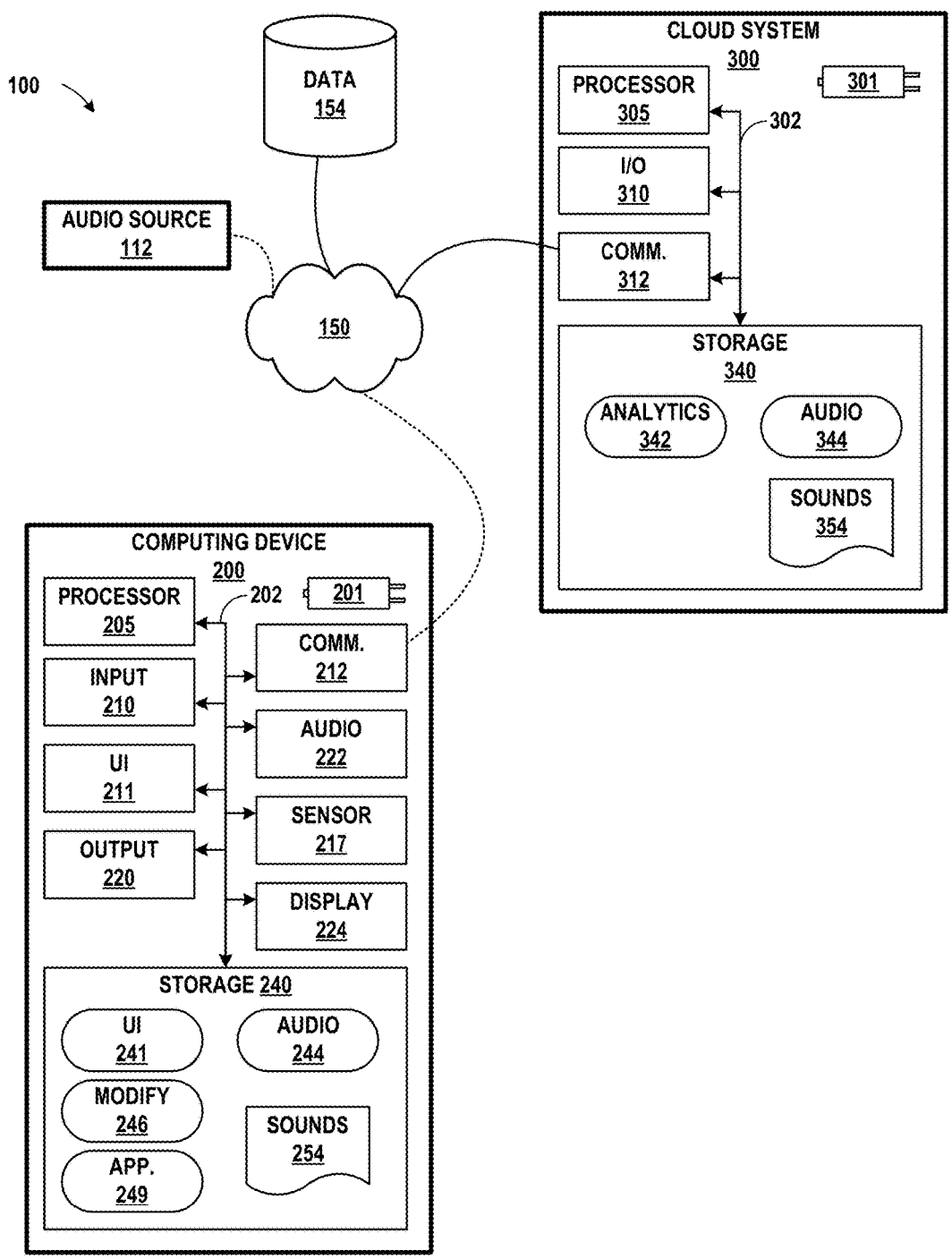
FIG. 2 is a block diagram illustrating an example system that is configured to process an audio data stream to modify one or more distracting, confusing, startling, or other sounds represented by data within the audio data stream, in accordance with one or more aspects of the present disclosure.

FIG. 2 is a block diagram illustrating an example system that is configured to process an audio data stream to modify one or more distracting, confusing, startling, or other sounds represented by data within the audio data stream, in accordance with one or more aspects of the present disclosure. System 100 of FIG. 2 is described as an example or alternate implementation of system 100 of FIG. 1. One or more aspects of FIG. 2 may be described herein within the context of system 100 of FIG. 1. FIG. 2 illustrates one example or alternate implementation of system 100. Other example or alternate implementations of system 100 may be appropriate in other instances. Such implementations may include a subset of the devices and/or components included in the example of FIG. 2 and/or may include additional devices and/or components not shown in FIG. 2. In the example of FIG. 2, system 100 includes network 150, one or more computing devices 200, and one or more cloud systems 300, one or more sound data sources 154, and one or more audio sources 112.

System 100 may be implemented in a number of different ways. In some examples, one or more devices of system 100 that are illustrated as separate devices may be implemented as a single device; one or more components of system 100 that are illustrated as separate components may be implemented as a single component. Also, in some examples, one or more devices of system 100 that are illustrated as a single device may be implemented as multiple devices; one or more components of system 100 that are illustrated as a single components may be implemented as multiple components. Further, one or more devices or components of system 100 that are illustrated in FIG. 2 may be implemented as part of another device or component not shown in FIG. 2.

Further, although system 100 may be illustrated as being distributed across multiple devices in FIG. 2, in other examples, the features and techniques attributed to one or more devices in FIG. 2 may be performed internally, by local components of one or more of such devices. Similarly, one or more of such devices may include certain components and perform various techniques that may otherwise be attributed in the description of FIG. 2 to one or more other devices. Further, certain operations, techniques, features, and/or functions may be described as performed by one or more components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Audio source 112 may be implemented in a manner consistent with the description of broadcast tower 110 provided earlier in connection with FIG. 1, and may include the same capabilities as broadcast tower 110 described in connection with FIG. 1. Accordingly, audio source 112 may be capable of broadcasting content within a region, or over a wired, wireless, and/or satellite network. In other examples, audio source 112 of FIG. 2 may be implemented as a content source on a network, and may be capable of responding to requests for content by streaming audio, video, or other content to one or more devices over network 150.

Network 150 may be part of the internet, or may represent any public or private network, for instance, cellular, Wi-Fi, satellite, and/or other types of networks, for transmitting data between computing systems, servers, and computing devices. One or more of cloud system 300, computing devices 200, or other devices may transmit and receive data, commands, control signals, and/or other information across network 150 using any suitable communication techniques. Network 150 may include one or more network hubs, network switches, network routers, or any other network equipment, that are operatively inter-coupled thereby providing for the exchange of information between computers, devices, or other components (e.g., between one or more computing devices 200 and one or more cloud systems 300). Computing devices 200 and cloud system 300 may each be operatively coupled to network 150 using one or more network links. The links coupling computing devices 200, cloud system 300, and/or other devices to network 150 may be Ethernet, ATM or other types of network connections, and such connections may be wireless and/or wired connections.

Computing device 200 may be implemented in a manner consistent with the description provided earlier in connection with FIG. 1, and may include the same capabilities as described in connection with FIG. 1. In other examples, computing device 200 of FIG. 2 may be implemented in a manner different than that described in connection with FIG. 1. For example, computing device 200 of FIG. 2 may include more capabilities than those described in connection with FIG. 1, less capabilities than those described in connection with FIG. 1, or capabilities different than those described in connection with FIG. 1.

Computing device 200 may include power source 201, one or more processors 205, one or more input devices 210, one or more user interface devices 211, one or more communication units 212, one or more output devices 220, one or more audio output devices 222, one or more sensor devices 217, and one or more storage devices 240. Storage device 240 may include user interface module 241, audio processing module 244, sound modification module 246, and sounds data store 254. One or more of the devices, modules, storage areas, or other components of computing device 200 may be interconnected to enable inter-component communications (physically, communicatively, and/or operatively). In some examples, such connectivity may be provided by through communication channels (e.g., communication channels 202), a system bus, a network connection, an inter-process communication data structure, or any other method for communicating data.

One or more audio output devices 222 and one or more sensor devices 217 may be implemented in a manner consistent with the description provided earlier in connection with FIG. 1, and may include the same capabilities as described in connection with FIG. 1. In other examples, audio output devices 222 and sensor devices 217 of FIG. 2 may be implemented in a manner different than that described in connection with FIG. 1. For example, one or more of audio output devices 222 and sensor devices 217 of FIG. 2 may include more capabilities than those described in connection with FIG. 1, less capabilities than those described in connection with FIG. 1, or capabilities different than those described in connection with FIG. 1.

Power source 201 may provide power to one or more components of computing device 200. Power source 201 may be a battery. In other examples, power source 201 may receive power from the primary alternative current (AC) power supply in a building, home, or other location. In still further examples, computing device 200 and/or power source 201 may receive power from another source. Power source 201 may have intelligent power management or consumption capabilities, and may such features may be controlled, accessed, or adjusted by one or more modules of computing device 200 and/or by one or more processors 205 to intelligently consume, allocate, supply, or otherwise manage power.

One or more input devices 210 may represent any input devices of computing device 200 not otherwise separately described herein. Input devices 210 may generate, receive, and/or process input. For example, one or more input devices 210 may generate or receive input from a keyboard, pointing device, voice responsive system, video camera, button, sensor, mobile input device, control pad, microphone, presence-sensitive screen, network, or any other type of device for detecting input from a human or machine.

One or more output devices 220 may represent any output devices of computing device 200 not otherwise separately described herein. Output devices 220 may generate, present, and/or process output. For example, one or more output devices 220 may generate, present, and/or process output in the form of tactile, audio, visual, and/or video output. Output devices 220 may include a sound card, video graphics adapter card, speaker, presence-sensitive screen, one or more USB interfaces, video and/or audio output interfaces, or any other type of device capable of generating tactile, audio, video, or other output.

Some devices may serve as both input and output devices. For example, a communication device may both send and receive data to and from other systems or devices over a network. Also, a presence-sensitive display may both detect input in the form of physical taps or gestures, and present output in the form of visual information.

One or more display devices 224 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display device 224 may include a cathode ray tube (CRT) monitor, liquid crystal display (LCD), Light-Emitting Diode (LED) display, or any other type of display device. In some examples, including where computing device 200 is implemented as a smartphone or mobile device, display device 224 may include a presence-sensitive panel, which may serve as both an input device and an output device. A presence-sensitive panel may serve as an input device where it includes a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. A presence-sensitive panel may serve as an output or display device when it includes a display component. Accordingly, a presence-sensitive panel or similar device may both detect user input and generate visual and/or display output, and therefore may serve as both an input device and an output device.

Computing device 200 may include user interface device 211, which may function as an input and/or output device for computing device 200. User interface device 211 may be implemented using various technologies. For instance, user interface device 211 may function as an input device using a presence-sensitive input screen, such as a resistive touchscreen, surface acoustic wave touchscreen, capacitive touchscreen, projective capacitance touchscreen, pressure sensitive screen, acoustic pulse recognition touchscreen, or another presence-sensitive display technology. In addition, user interface device 211 may include microphone technologies, voice activation and/or recognition technologies, cameras, infrared sensor technologies, or other input device technology for use in receiving user input.

User interface device 211 may function as output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 200. In addition, user interface device 211 may include speaker technologies, haptic feedback technologies, tactile feedback technologies, light emitting technologies, or other output device technologies for use in outputting information to a user.

User interface device 211 may include a presence-sensitive display that may receive tactile input from a user of computing device 200. User interface device 211 may receive indications of tactile input by detecting one or more gestures from a user (e.g., the user touching or pointing to one or more locations of user interface device 211 with a finger or a stylus pen). User interface device 211 may present output to a user, for instance, at a presence-sensitive display. User interface device 211 may present the output as a graphical user interface. For example, user interface device 211 may present various user interfaces related to functions provided by one or more modules of computing device 200 or another feature of a computing platform, operating system, application, and/or service executing at or accessible from computing device 200 (e.g., an electronic message application, Internet browser application, a mobile or desktop operating system, etc.).

User interface module 241 may manage user interactions with user interface device 211 and other components of computing device 200. User interface module 241 may cause user interface device 211 to output various user interfaces for display or presentation or otherwise, as a user of computing device 200 views output and/or provides input at user interface device 211. User interface device 211 may detect input, and may output to user interface module 241 one or more indications of input as a user of computing device 200 interacts with a user interface presented at user interface device 211. User interface module 241 and user interface device 211 may interpret inputs detected at user interface device 211 and may relay information about the inputs detected at user interface device 211 to one or more associated platforms, operating systems, applications, and/or services executing at computing device 200 to cause computing device 200 to perform one or more functions.

User interface module 241 may receive information and instructions from a platform, operating system, application, and/or service executing at computing device 200 and/or one or more remote computing systems. In addition, user interface module 241 may act as an intermediary between a platform, operating system, application, and/or service executing at computing device 200 and various output devices of computing device 200 (e.g., speakers, LED indicators, audio or electrostatic haptic output devices, light emitting technologies, displays, etc.) to produce output (e.g., a graphic, a flash of light, a sound, a haptic response, etc.).

User interface module 241 may perform operations described using software, hardware, firmware, or a mixture of hardware, software, and firmware residing in and/or executing at computing device 200. Computing device 200 may execute user interface module 241 with multiple processors or multiple devices, as a virtual machine executing on underlying hardware, as one or more services of an operating system or computing platform, and/or as one or more executable programs at an application layer of a computing platform.

One or more communication units 212 of computing device 200 may communicate with devices external to computing device 200 by transmitting and/or receiving data, and may operate, in some respects, as both an input device and an output device. In some examples, communication unit 212 may communicate with other devices over a network. In other examples, communication units 212 may send and/or receive radio signals on a radio network such as a cellular radio network. In other examples, communication units 212 of computing device 200 may transmit and/or receive satellite signals on a satellite network such as a Global Positioning System (GPS) network. Examples of communication units 212 include a network interface card (e.g. such as an Ethernet card), an optical transceiver, a radio frequency transceiver, a GPS receiver, or any other type of device that can send and/or receive information. Other examples of communication units 212 may include Bluetooth®, GPS, cellular networks (e.g., 3G, 4G), and Wi-Fi® radios found in mobile devices as well as Universal Serial Bus (USB) controllers and the like.

One or more processors 205 of computing device 200 may implement functionality and/or execute instructions associated with computing device 200. Examples of processors 205 include microprocessors, application processors, display controllers, auxiliary processors, one or more sensor hubs, and any other hardware configured to function as a processor, a processing unit, or a processing device. Computing device 200 may use one or more processors 205 to perform operations in accordance with one or more aspects of the present disclosure using software, hardware, firmware, or a mixture of hardware, software, and firmware residing in and/or executing at computing device 200.

One or more storage devices 240 within computing device 200 may store information for processing during operation of computing device 200. In some examples, one or more storage devices 240 are temporary memories, meaning that a primary purpose of the one or more storage devices is not long-term storage. Storage devices 240 on computing device 200 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 240, in some examples, also include one or more computer-readable storage media. Storage devices 240 may be configured to store larger amounts of information than volatile memory. Storage devices 240 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 240 may store program instructions and/or data associated with one or more of the modules described in accordance with one or more aspects of this disclosure.

One or more storage devices 240 of computing device 200 may include one or more modules, as further described herein. One or more processors 205 and one or more storage devices 240 may provide an operating environment or platform for such modules, which may be implemented as software, but may in some examples include any combination of hardware, firmware, and software. One or more processors 205 may execute instructions and one or more storage devices 240 may store instructions and/or data of one or more modules. The combination of processors 205 and storage devices 240 may retrieve, store, and/or execute the instructions and/or data of one or more applications, modules, or software. Processors 205 and/or storage devices 240 may also be operably coupled to one or more other software and/or hardware components, including, but not limited to, one or more of the components of computing device 200 and/or one or more devices or systems illustrated as being connected to computing device 200.

Audio processing module 244, sound modification module 246, and sounds data store 254 may be implemented in a manner consistent with the description provided earlier in connection with FIG. 1, and may include the same capabilities as described in connection with FIG. 1. In other examples, audio processing module 244, sound modification module 246, and sounds data store 254 of FIG. 2 may be implemented in a manner different than that described in connection with FIG. 1. For example, one or more of audio processing module 244, sound modification module 246, and sounds data store 254 of FIG. 2 may include more capabilities than those described in connection with FIG. 1, less capabilities than those described in connection with FIG. 1, or capabilities different than those described in connection with FIG. 1.

One or more application modules 249 may represent some or all of the other various individual applications and/or services executing at and accessible from computing device 200. A user of computing device 200 may interact with a graphical user interface associated with one or more application modules 249 to cause computing device 200 to perform a function. Numerous examples of application modules 249 may exist and may include satellite radio applications, podcast streaming applications, navigation applications, web browsing, search, communication, and shopping applications, and any and all other applications that may execute at computing device 200.

One or more sound data sources 154 may be implemented as any suitable computing system serving as one or more servers, cloud systems, expert systems, or intelligent storage devices. As further described below in connection with sound analytics module 342 of cloud system 300, sound data sources 154 may serve as a source for information about sounds or indications of sounds from or relating to movies, television programs, ring tones, device notifications, device operation audio effects and/or commercials played on television, radio, online, and elsewhere.

One or more cloud systems 300 may be implemented as any suitable computing system, such as one or more server computers, desktop computers, laptop computers, mainframes, appliances, cloud computing systems, and/or other computing systems capable of sending and receiving information both to and from a network, such as network 150. In some examples, cloud system 300 represents a cloud computing system that provides services to client devices and other devices or systems. For example, cloud system 300 may host or provide access to services provided by one or more modules of cloud system 300. Client devices (e.g., one or more computing devices 200) may communicate with cloud system 300 over network 150 to access services provided by one or more modules of cloud system 300. Cloud system 300 may provide, for instance, access to a database of sounds and context information, and may enable one or more computing devices 200 to determine whether data associated with a particular sound has, if output as an audio signal, a likelihood of causing distraction or confusion in a given context. Cloud system 300 may also provide an audio processing service for modifying an audio data stream to remove or modify data associated with sounds that may cause distraction or confusion.

Although cloud system 300 of FIG. 2 may be a standalone device, one or more cloud systems 300 may, generally, take many forms, and may be, or may be part of, any component, device, or system that includes a processor or other suitable computing environment for processing information or executing software instructions. In some examples, cloud system 300 may be fully implemented as hardware in one or more devices or logic elements.

In the example of FIG. 2, cloud system 300 may include power source 301, one or more processors 305, one or more input/output devices 310, one or more communication units 312, and one or more storage devices 340. In the example of FIG. 2, storage device 340 includes sound analytics module 342, audio processing module 344, and sounds data store 354. One or more of the devices, modules, storage areas, or other components of cloud system 300 may be interconnected to enable inter-component communications (physically, communicatively, and/or operatively). In some examples, such connectivity may be provided by through communication channels (e.g., communication channels 302), a system bus, a network connection, an inter-process communication data structure, or any other method for communicating data.

Power source 301 may provide power to one or more components of cloud system 300. Power source 301 may receive power from the primary alternative current (AC) power supply in a building, home, or other location. In other examples, power source 301 may be a battery. In still further examples, cloud system 300 and/or power source 301 may receive power from another source. Power source 301 may have intelligent power management or consumption capabilities, and may such features may be controlled, accessed, or adjusted by one or more modules of cloud system 300 and/or by one or more processors 305 to intelligently consume, allocate, supply, or otherwise manage power.

One or more input/output devices 310 may generate, receive, and/or process input from a keyboard, pointing device, voice responsive system, or any other type of device for detecting input from a human or machine. One or more input/output devices 310 may generate, present, and/or process output. For example, one or more input/output devices 310 may generate, present, and/or process output in the form of tactile, audio, visual, and/or video output. Some devices may serve as only input devices, some devices may server as only output devices, and some devices may serve as both input and output devices.

One or more communication units 312 of cloud system 300 may communicate with devices external to cloud system 300 by transmitting and/or receiving data, and may operate, in some respects, as both an input device and an output device. In some examples, communication unit 312 may communicate with other devices over a network. In other examples, communication units 312 may send and/or receive radio signals on a radio network such as a cellular radio network. In other examples, communication units 312 of cloud system 300 may transmit and/or receive satellite signals on a satellite network such as a Global Positioning System (GPS) network.

One or more processors 305 of cloud system 300 may implement functionality and/or execute instructions associated with cloud system 300. Examples of processors 305 include microprocessors, application processors, display controllers, auxiliary processors, one or more sensor hubs, and any other hardware configured to function as a processor, a processing unit, or a processing device. Cloud system 300 may use one or more processors 305 to perform operations in accordance with one or more aspects of the present disclosure using software, hardware, firmware, or a mixture of hardware, software, and firmware residing in and/or executing at cloud system 300.

One or more storage devices 340 within cloud system 300 may store information for processing during operation of cloud system 300. In some examples, one or more storage devices 340 are temporary memories, meaning that a primary purpose of the one or more storage devices is not long-term storage. Storage devices 340 on cloud system 300 may be configured for short-term storage of information as volatile memory and therefore not retain stored contents if deactivated. Storage devices 340, in some examples, also include one or more computer-readable storage media. Storage devices 340 may be configured to store larger amounts of information than volatile memory. Storage devices 340 may further be configured for long-term storage of information as non-volatile memory space and retain information after activate/off cycles. Storage devices 340 may store program instructions and/or data associated with one or more of the modules described in accordance with one or more aspects of this disclosure.

One or more storage devices 340 of cloud system 300 may include one or more modules, as further described herein. One or more processors 305 and one or more storage devices 340 may provide an operating environment or platform for such modules, which may be implemented as software, but may in some examples include any combination of hardware, firmware, and software. One or more processors 305 may execute instructions and one or more storage devices 340 may store instructions and/or data of one or more modules. The combination of processors 305 and storage devices 340 may retrieve, store, and/or execute the instructions and/or data of one or more applications, modules, or software. Processors 305 and/or storage devices 340 may also be operably coupled to one or more other software and/or hardware components, including, but not limited to, one or more of the components of cloud system 300 and/or one or more devices or systems illustrated as being connected to cloud system 300.

Sound analytics module 342 may generally perform functions relating to identifying or cataloging data associated with one or more sounds that may be considered distracting, confusing, or startling in various situations. Sound analytics module 342 may query one or more sound data sources 154 for information about sounds or indications of sounds from commercials played on television, radio, online, and elsewhere. Sound analytics module 342 may query one or more sound data sources 154 for information about sounds or indications of sounds from movies, television programs, music, or other types of content. Sound analytics module 342 may query one or more sound data sources 154 for information about sounds or indications of sounds used as ring tones, device notifications, or device operation audio effects. Sound analytics module 342 may analyze such information and determine one or more sounds that may be considered distracting, confusing, and/or startling in some situations. Sound analytics module 342 may determine contextual information that may be relevant to identifying sounds as distracting or confusing. Sound analytics module 342 may store information and/or data associated with sounds and/or information about contexts in which such sounds are likely to be considered distracting, confusing, and/or startling. Sound analytics module 342 may respond to requests for information by sending over network 150 information about sounds and/or information about context in which such sounds may be distracting, confusing, and/or startling.

Audio processing module 344 may perform functions relating to detecting data associated with sounds within an audio data stream, in a manner similar to that performed by audio processing module 244. Audio processing module 344 may interact with and/or operate in conjunction with one or more modules of cloud system 300. Audio processing module 344 may receive information from communication units 312, and apply an audio fingerprint or matching algorithm to identify data associated with one or more sounds included within an audio data stream. Audio processing module 344 may access sound information stored in sounds data store 354, and compare sound information in an audio data stream to sound information stored in sounds data store 354. Audio processing module 344 may use a context in which a sound is expected to be heard to determine if that sound, if output by a computing device as an audio signal, may cause distraction or confusion. Audio processing module 344 may modify an audio data stream to replace data associated with distracting sounds with data associated with alternate sounds.

Sounds data store 354 may represent any suitable storage medium for storing information related to audio information, data associated with sounds, and/or contexts or situations in which such sounds may occur. The information stored in sounds data store 354 may be searchable and/or categorized such that computing device 200 and/or one or more modules within cloud system 300 may provide an input requesting information from sounds data store 354, and in response to the input, receive information stored within sounds data store 354. Sounds data store 354 may be primarily maintained by audio processing module 344 and may store sound information for multiple contexts. Sounds data store 354 may receive sound information from sound data sources 154 over network 150. Sounds data store 354 may provide other modules or network devices with access to the data stored within sounds data store 354, and/or may analyze the data stored within sounds data store 354 and output such information on behalf of other modules of cloud system 300 or devices on network 150.

In the example of FIG. 2, cloud system 300 may access, retrieve, and/or identify information about potentially distracting sounds. For instance, sound analytics module 342 of cloud system 300 may cause communication unit 312 to output one or more signals over network 150. Servers associated with one or more sound data sources 154 may receive the signal over network 150, and interpret the signal as a request for information. One or more sound data sources 154 may output to network 150 a responsive signal. Communication unit 312 of cloud system 300 may detect the signal and output to sound analytics module 342 an indication of the signal. Sound analytics module 342 may determine that the signal corresponds to information about distracting, confusing, or similar sounds. For example, information from sound data sources 154 may include data representing sounds from commercials played on television, radio, online, or elsewhere. Such data may also include data representing sounds from movies, television programs, music, or other types of content. Such information may further include data representing ring tones, device notification sounds, or device operation sounds. Such information may further include information and/or data corresponding to ambient noise sounds that may be distracting in some situations.

Cloud system 300 may determine, based on the information retrieved from one or more sound data sources 154, one or more sounds that may cause distraction in various situations. For example, sound analytics module 342 may perform an analysis of the information retrieved from sound data sources 154, which may include information about the context in which sounds might be expected to be heard. Sound analytics module 342 may determine one or more situations or contexts in which a sound may be distracting. As previously described, for example, a car horn heard in a theatre is less likely to be distracting than the same car horn heard on a car radio, as in FIG. 1. Accordingly, the context in which a sound is heard may affect the extent to which it may be considered distracting. Sound analytics module 342 may store data corresponding to potentially distracting, confusing, and/or startling sounds in sounds data store 354, along with associated contexts in which such sounds may be considered distracting, confusing, and/or startling.

Cloud system 300 may send information about distracting sounds to computing device 200. For example, sound analytics module 342 of cloud system 300 may cause communication unit 312 to output a signal over network 150. Communication unit 212 of computing device 200 may detect a signal, and output an indication of the signal to audio processing module 244. Audio processing module 244 may determine that the signal corresponds to information about potentially distracting sounds, such as data representing such sounds. Audio processing module 244 may store data representing sounds, or information describing characteristics of such sounds, in sounds data store 254.

Computing device 200 may determine, using the information received from cloud system 300, that an audio data stream signal includes data corresponding to one or more distracting sounds. For example, communication unit 212 may detect signals over network 150. Communication unit 212 may output indications of the detected signals to audio processing module 244. Audio processing module 244 may determine that the signals correspond to an audio data stream. Audio processing module 244 may determine that the audio data stream includes one or more indications of potentially distracting sounds (a police siren or a car horn).

Audio processing module 244 may output to sound modification module 246 the audio data stream, information about the audio data stream, and/or information about the potentially distracting sounds. Sound modification module 246 may modify the audio data stream so that each instance of data associated with a potentially distracting sound is replaced by data associated with an alternate sound. Sound modification module 246 may output to audio processing module 244 the modified audio data stream. Audio processing module 244 may cause user interface module 241 to output an audio signal corresponding to the modified audio data stream through audio output device 222. As a result, a user near audio output device 222 may hear the alternate sounds instead of the distracting sounds.

In other examples, rather than using sound modification module 246 to replace data associated with the potentially distracting sound within the audio data stream, audio processing module 244 may send an unmodified audio data stream to audio output device 222, and control the operation of audio output device 222 so that when audio output device 222 produces an audible signal from the data within the audio data stream that corresponds to the potentially distracting sound, the audio output device 222 produces an alternate sound. In another example, rather than control the operation of audio output device 222 to produce an alternate sound, audio processing module 244 may send the data within the audio data stream that corresponds to the potentially distracting sound to a different audio output device 222 that is configured to produce an alternate sound. In either case, the alternate sound produced from the data corresponding to the potentially distracting sound may be sufficiently different from the potentially distracting sound so as to avoid distraction and/or confusion.

Computing device 200 may periodically or occasionally receive information about distracting sounds from cloud system 300. For example, audio processing module 244 may cause communication unit 212 to output a signal over network 150. Communication unit 312 of cloud system 300 may detect a signal, and output to sound analytics module 342 an indication of the detected signal. Sound analytics module 342 may determine that the detected signal corresponds to a request, from computing device 200, for information from sounds data store 354. Sound analytics module 342 may retrieve information from sounds data store 354 and output a signal over network 150. Communication unit 212 may detect a signal and output to audio processing module 244 an indication of the detected signal. Audio processing module 244 may determine that the signal includes information about distracting sounds, which may include new sounds, not previously stored in sounds data store 254. Audio processing module 244 may store some or all of the information in sounds data store 254, and such information may include information describing characteristics of one or more distracting, surprising, or confusing sounds. Computing device 200 may periodically send additional requests to cloud system 300 for updated information about distracting sounds. Cloud system 300 may respond, and computing device 200 may update sounds data store 254 accordingly. In some examples, rather than computing device 200 periodically requesting updated distracting sound information from cloud system 300, cloud system 300 may periodically notify computing device 200 and/or send to computing device 200 information relating to distracting sounds.

Computing device 200 may receive an audio data stream, send it to cloud system 300 to be processed remotely, and receive a modified data stream from cloud system 300 for output at computing device 200. For example, communication unit 212 may detect signals over network 150. Communication unit 212 may output indications of the detected signals to audio processing module 244. Audio processing module 244 may cause communication unit 212 to send an indication of the detected signals to cloud system 300 over network 150. Audio processing module 244 may include within the information sent over network 150 information about the context of computing device 200. Communication unit 312 of cloud system 300 may detect input, and output to audio processing module 344 an indication of detected input. Audio processing module 344 may determine that the input corresponds to an audio data stream from computing device 200. Audio processing module 344 may further determine that the input includes information about the context of computing device 200. Audio processing module 344 may analyze the audio data stream and determine whether it includes one or more indications of potentially distracting sounds. For example, audio processing module 344 may compare data associated with sounds included in the audio data stream with data associated with sounds in sounds data store 354. Audio processing module 344 may modify the audio data stream so that data associated with the potentially distracting sounds is replaced with data associated with alternate sounds. Audio processing module 344 may cause communication unit 312 to output a signal over network 150. Communication unit 212 of computing device 200 may detect a signal, and output an indication of the signal to audio processing module 244. Audio processing module 244 may determine that the detected signal corresponds to an audio data stream, which may have been modified by cloud system 300. Audio processing module 244 may cause user interface module 241 to output audio content through audio output device 222 corresponding to the modified audio data stream, so that the resulting sound includes alternate sounds in place of distracting sounds.

In some examples, where cloud system 300 processes the audio data stream, cloud system 300 may send to computing device 200 information describing how to modify the audio data stream, rather than send to computing device 200 the audio data stream. In such an example, bandwidth might be conserved where the information describing how to perform modifications to the audio data stream requires less data than the audio data stream itself. For example, cloud system 300 may receive an audio data stream and determine modifications (if any) that might be made to the audio data stream to account for (e.g., modify) data associated with distracting sounds. Cloud system 300 may send information about modifications that could be made to the audio data stream to computing device 200 over network 150. Audio processing module 244 of computing device 200 may receive the information and perform the modifications at computing device 200 on the audio data stream that is available at computing device 200. Audio processing module 244 may cause user interface module 241 to output an audio signal through audio output device 222 corresponding to the modified audio data stream.

Accordingly, in the above example, cloud system 300 remotely processes an audio data stream received by computing device 200 from audio source 112. In other examples, functionality included in cloud system 300 may be incorporated into audio source 112, so that audio source 112 may, prior to broadcasting a signal or streaming an audio data stream, modify or remove data associated with potentially distracting and/or confusing sounds.

In examples described in connection with FIG. 1 and FIG. 2, cloud system 300 may analyze an audio data stream that it receives from computing device 200, thereby communicating to cloud system 300 information about content being consumed by a user of computing device 200. In some examples, such information about content and related contexts may reveal information about that user's preferences, interests, and habits. Accordingly, cloud system 300 might in some situations perform such analysis on the audio data stream only if computing device 200 receives permission from the user of computing device 200 (e.g., an occupant of automobile 121). For example, in situations described or discussed in this disclosure, before one or more server, client, cloud or other computing device or system may collect or make use of information associated with a user, the user may be provided with an opportunity to provide input to control whether programs or features of any such computing device or system can collect and make use of user information (e.g., radio stations listened to, information about context and activities, information about a user's current location, current speed, etc.), or to dictate how or whether such information may be used, accessed, or stored. In addition, certain data may be treated in one or more ways before it is stored or used by any computing device, so that personally-identifiable information is removed. Thus, the user may have control over how information is collected about the user and used by computing devices and/or systems.

Figure 3:
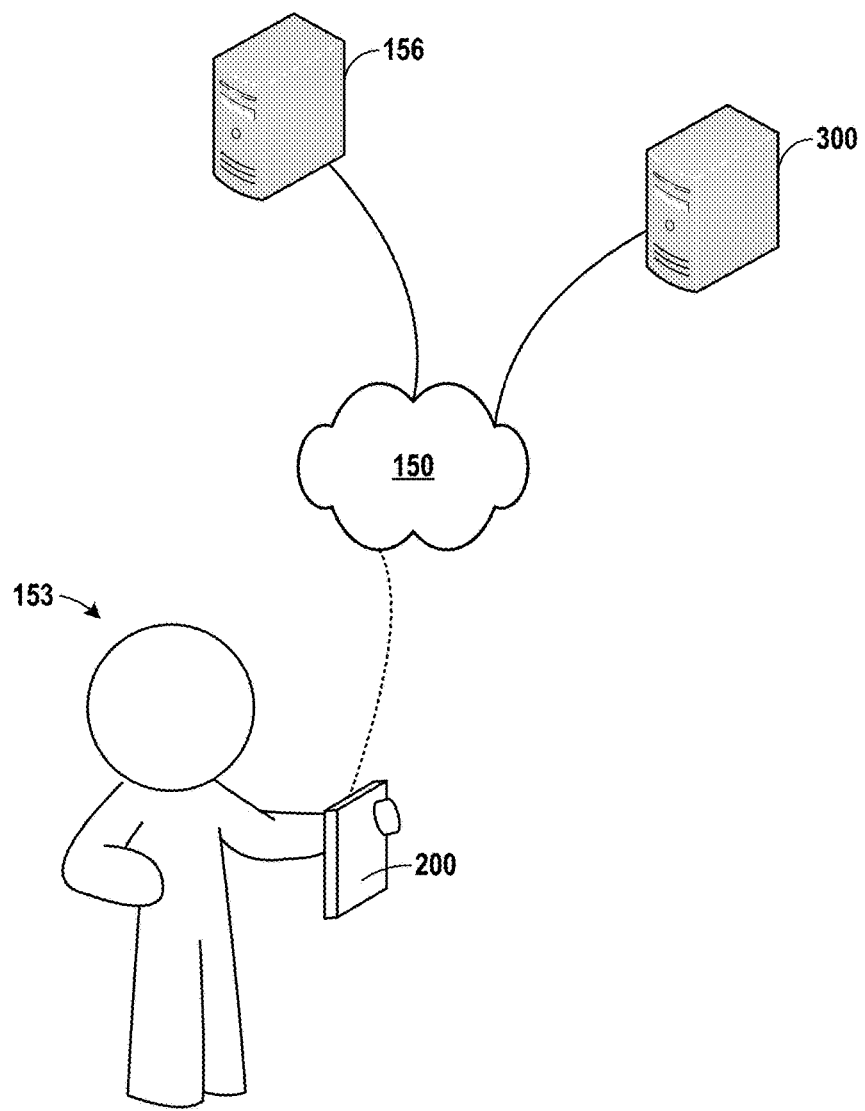
FIG. 3 is a conceptual diagram illustrating an example computing device that processes audio data streamed from an example content server so that data within the streamed audio that corresponds to one or more distracting sounds is modified, in accordance with one or more aspects of the present disclosure.

FIG. 3 is a conceptual diagram illustrating an example computing device that processes audio data streamed from an example content server so that data within the streamed audio that corresponds to one or more distracting sounds is modified, in accordance with one or more aspects of the present disclosure. Computing device 200 of FIG. 3 is described as an example or alternate implementation of computing device 200 of FIG. 2. One or more aspects of FIG. 3 may be described herein within the context of computing device 200 of FIG. 2. In the example of FIG. 3, computing device 200 is in communication, via network 150, with one or more content servers 156. Further, computing device 200 may communicate with one or more cloud systems 300 to access information about sounds that may be distracting, confusing, surprising, or startling in various situations.

In FIG. 3, computing device 200 may identify information about potentially distracting sounds based at least in part on sounds that computing device 200 might emit during operation (e.g. rings, notification sounds, alarms, voice prompts, reminders, meeting notices, other information notices, etc.). For example, with reference to FIG. 2, audio processing module 244 may output a query to one or more application modules 249. One or more application modules 249 may, in response to the query, determine information about sounds that could be made by computing device 200 during operation. For instance, one or more application modules 249 may determine that computing device 200 may output a ringtone sound when computing device 200 receives a phone call. One or more application modules 249 may determine that computing device 200 may output a different notification sound when an email or text message is received, or another event occurs. One or more application modules 249 may output to audio processing module 244 information about such sounds. Alternatively, or in addition, audio processing module 244 may access a registry, settings, or configuration information stored in storage device 240 (or elsewhere) in order to determine information about one or more sounds, including ringtones or other notification sounds, that could be made by computing device 200. Audio processing module 244 may store information about such sounds in sounds data store 254, whether received from one or more application modules 249, from a registry or similar information store, or otherwise.

Computing device 200 may receive an audio data stream. For example, referring to both FIG. 2 and FIG. 3, user interface device 211 may detect input, and output to user interface module 241 an indication of input. User interface module 241 may receive the indication of input, and output to audio processing module 244 information about the input. Audio processing module 244 may determine that the input corresponds to a request by user 153 to stream audio or video content. Audio processing module 244 may output a signal to content server 156 over network 150. Content server 156 may receive the signal and determine that the signal corresponds to a request to start streaming content stored at content server 156. Content server 156 may begin streaming, over network 150, an audio data stream corresponding to or included within the requested content. Computing device 200 may receive the audio data stream over network 150.

Computing device 200 may modify the audio data stream to modify or replace data corresponding to ringtones, alert notification sounds, or other sounds that may be emitted by computing device 200 during operation. For example, while the audio data stream is being streamed to computing device 200 and before an audio signal corresponding to a given portion of the audio data stream is output by computing device 200, audio processing module 244 may determine whether that portion of the audio data stream includes one or more indications of distracting sounds that match indications of sounds stored in sounds data store 254. Audio processing module 244 may determine that the audio data stream includes data corresponding to a ringtone associated with computing device 200. Audio processing module 244 may output to sound modification module 246 information about the audio data stream and the ringtone. Sound modification module 246 may modify the audio data stream to replace the data associated with the ringtone with data associated with an alternate sound. Sound modification module 246 may output the modified audio data stream to audio processing module 244. Audio processing module 244 may cause user interface module 241 to output audio content corresponding to the modified audio data stream through audio output device 222, with the result being that the identified ringtone is not heard by user 153. By modifying the audio data stream so that the ringtone is not heard in the audio content output by the audio output device, computing device 200 may avoid distracting user 153. In other words, if user 153 did hear a ringtone sound as a result of outputting an audio signal corresponding to the streamed content, the user may mistakenly believe that computing device 200 is receiving an incoming phone call, thereby causing user 153 to divert attention from the streamed content.

Figure 4A:
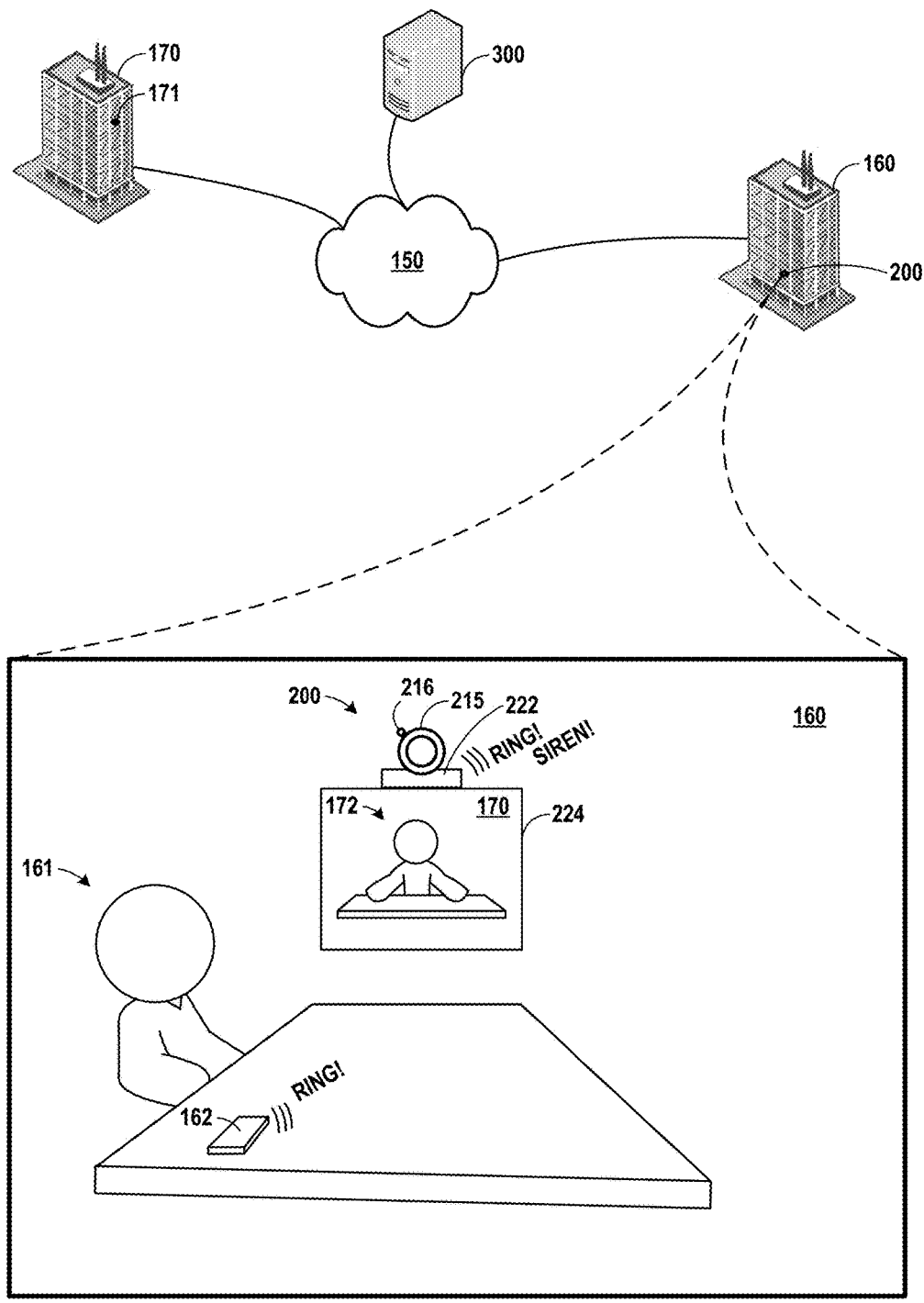
FIG. 4A and FIG. 4B illustrate an example computing device that may process an audio data stream during a video conferencing session, in accordance with one or more aspects of the present disclosure.
Figure 4B:
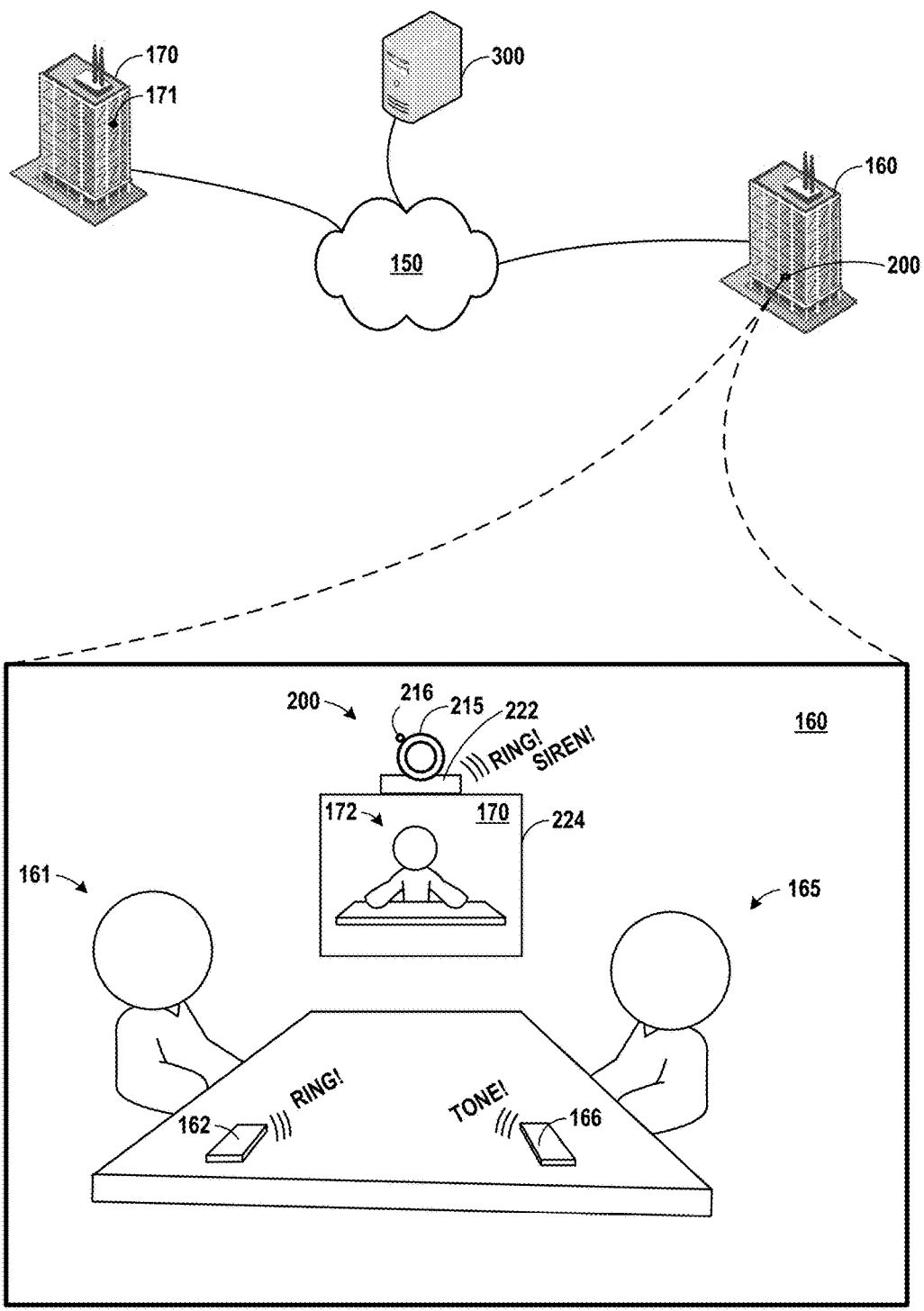

FIG. 4A and FIG. 4B illustrate an example computing device that may process an audio data stream during a video conferencing session, in accordance with one or more aspects of the present disclosure. In the example of FIG. 4A and FIG. 4B, computing device 200 within building 160 is in communication, via network 150, with remote computing device 171 in remote building 170. Computing device 200 and remote computing device 171 may enable communication between user 161 and remote user 172 over network 150, with user 161 physically located within building 160 and remote user 172 physically located within remote building 170. In the example of FIG. 4A and FIG. 4B, remote computing device 171 serves as an audio source for computing device 200, with at least audio content streamed from remote computing device 171 within remote building 170 over network 150 to computing device 200 within building 160. Remote computing device 171 may also stream video data over network 150 to computing device 200, and display device 224 within building 160 may display an image or near-live video of remote user 172 within remote building 170. Computing device 200 of FIG. 4A and FIG. 4B is described as an example or alternate implementation of computing device 200 of FIG. 2, and one or more aspects of FIG. 4A and FIG. 4B may be described herein within the context of computing device 200 of FIG. 2. In FIG. 4A and FIG. 4B, in addition to components previously described, computing device 200 includes camera 215 and microphone 216 to implement functionality relating to a video conference.

In some examples, computing device 200 may apply an audio fingerprint or matching algorithm that compares an indication of a sound in an audio data stream with an indication of a sound expected to cause distraction. The matching algorithm and any subsequent modification of the audio data stream may introduce a time delay relative to the receipt, by computing device 200, of the signal that includes the audio data stream. Accordingly, seemingly near real-time processing of an audio data stream to detect and modify potentially distracting sounds may require significant processing power and/or network speeds in order to minimize delay. However, given sufficient processing power and sufficient network speeds, computing device 200 may process an audio data stream in close to real time, and effectively remove potentially distracting sounds in a seemingly real time application, such as a videoconference application, without disrupting efficient communications.

Accordingly, computing device 200 may initiate a video conference with remote computing device 171 of remote building 170. For example, computing device 200 within building 160 may detect input that it determines corresponds to a request to initiate a video conference with remote computing device 171 within remote building 170. Computing device 200 may output a signal over network 150. Remote computing device 171 within remote building 170 may receive the signal, further communicate with computing device 200 within building 160, and establish a video conference session with computing device 200.

Prior to or during the videoconference, computing device 200 may query devices within the vicinity of computing device 200 for information about sounds that such devices may make. Computing device 200 may output a signal. Mobile device 162 may detect the signal, and determine that it corresponds to a request for information about sounds that mobile device 162 may make during operation. Mobile device 162 may respond by outputting a signal. Computing device 200 may detect the signal and determine that the signal corresponds to information about a ringtone sound that is generated by mobile device 162 when mobile device 162 receives a phone call. Computing device 200 may store information about the ringtone associated with mobile device 162.

Computing device 200 may detect, during the videoconference, data within an audio data stream received over network 150 that corresponds to the ringtone sound. For example, computing device 200 may receive a signal over network 150 that it determines corresponds to an audio data stream representing sounds originating at remote building 170 near remote computing device 171. Computing device 200 may analyze the audio data stream and determine whether the audio data stream includes an indication of a potentially distracting sound (e.g., a ringtone, siren, fire alarm). Computing device 200 may determine that the audio data stream includes data that is the same as or that corresponds to data associated with the ringtone associated with mobile device 162. This may happen, for example, if a phone rings within the vicinity of remote computing device 171, and the ringtone for that phone is the same as the ringtone for mobile device 162. The remote computing device 171 may detect audio that includes the ringtone sound, and may include data representing the ringtone sound within the audio data stream transmitted over network 150 to computing device 200.

Computing device 200 may modify the audio data stream and replace data associated with the ringtone sound with data associated with an alternate sound. Computing device 200 may cause an audio signal corresponding to the modified audio data stream to be output through audio output device 222. In the example described, computing device 200 may avoid distracting user 161 by preventing the ringtone for mobile device 162 from being heard when outputting the audio signal produced from the audio data stream received from remote computing device 171. If the audio signal output by audio output device 222 did include a sound that matches the ringtone for mobile device 162, user 161 might mistakenly believe that mobile device 162 is receiving a phone call, which would likely distract user 161. Accordingly, in the examples described in connection with FIG. 4A and FIG. 4B, a context may be established based at least in part on devices in a room during a video conference. In other words, depending on the devices in the room during a video conference, one or more sounds may be identified as being distracting sounds, whereas in other video conferences, those same sounds might not be considered distracting sounds.

During the videoconference illustrated in FIG. 4A, computing device 200 may detect additional devices that enter the vicinity of computing device 200. For example, as illustrated in FIG. 4B, mobile device 166 may be brought within the vicinity of computing device 200 (e.g., carried and placed on a table near computing device 200 by user 165) during the videoconference. Computing device 200 may periodically output a signal. After mobile device 166 is brought within the vicinity of computing device 200, mobile device 166 may detect the signal, and determine that it corresponds to a request for information about sounds that mobile device 166 may make. Mobile device 166 may respond by outputting a signal that includes information about a tone that may be emitted by mobile device 166 whenever a text message is received. Computing device 200 may detect the signal and store the information about the tone.

Computing device 200 may detect, during the videoconference, data within an audio data stream received over network 150 that corresponds to the tone. For example, computing device 200 may continue to receive, during the video conference, signals corresponding to an audio data stream representing sounds made at remote building 170 near remote computing device 171. Computing device 200 may analyze the audio data stream, and determine that the audio data stream includes an indication of a sound that matches or corresponds to the tone emitted by mobile device 166 when a text message is received by mobile device 166. Computing device 200 may modify the audio data stream and replace the data associated with the tone with data associated with an alternate sound. Computing device 200 may cause an audio signal corresponding to the modified audio data stream to be output through audio output device 222. By modifying the audio data stream by replacing the tone with the alternate sound, computing device 200 may avoid causing user 165 to mistakenly believe that mobile device 166 received a text message.

By removing or modifying certain sounds within an audio signal output by a computing device that serves as a communications device, as illustrated in FIG. 4A and FIG. 4B, at least some users using the communications device to communicate are less likely to be distracted by sounds output by the communications device. As a result, the audio or video conference will be conducted more efficiently. Accordingly, in at least some examples, techniques described in this disclosure may improve the communications function of computing device 200 in FIG. 4A and FIG. 4B, as computing device 200 may conduct audio or video conferences more efficiently and more effectively. By conducting audio or video conferences more effectively, such calls may take less time to complete, and as a result, computing device 200 may perform operations over a shorter period of time. Accordingly, by performing operations over a shorter period of time, computing device 200 may consume less electrical power.

In some examples described herein, computing device 200 and/or cloud system 300 determine whether data associated with a sound in an audio data stream may be distracting by comparing data to data stored in sounds data store 254 and/or sounds data store 354. In other examples, computing device 200 or cloud system 300 may apply a sound recognition algorithm to determine the nature of the detected sound. For instance, audio processing module 244 of computing device 200 may be configured to detect a siren, fire alarm, or other sound algorithmically, without applying a matching algorithm. In such examples, audio processing module 244 may recognize potentially distracting sounds, and along with contextual information determined by computing device 200, may modify or alter such sounds in an audio data stream to avoid distracting a user. In other examples, audio processing module 244 may be configured to detect potentially distracting sounds by applying both a sound detection algorithm as well as a matching algorithm.

In some examples described herein, computing device 200 may analyze or modify an audio data stream in seemingly near real-time, and such processing may be performed quickly, to avoid introducing a significant delay. In cases where near-real time communications are important, such as a videoconference, a delay could disrupt the communications between parties to the videoconference. A delay of one to three seconds might be too long in some situations. Accordingly, in some cases, computing device 200 may emphasize speed over accuracy in analyzing and modifying an audio data stream. In such examples, modifications made by computing device 200 may be assistive in nature, in the sense that computing device 200 might not be effective in detecting and modifying every distracting sound. Further, computing device 200 might not be able complete a matching algorithm in time to modify all the data associated with a particular sound, but computing device 200 may be able to modify a portion of the data (e.g., the data associated with the end of the sound). Modifying a portion of the data associated with the sound may be sufficient in many cases to have the effect of avoiding distraction or confusion. In other examples, however, where a delay is more acceptable (e.g., a radio broadcast), computing device 200 might emphasize accuracy over speed, and computing device 200 might be more effective in detecting and modifying data associated with distracting sounds in an audio data stream.

Figure 5:
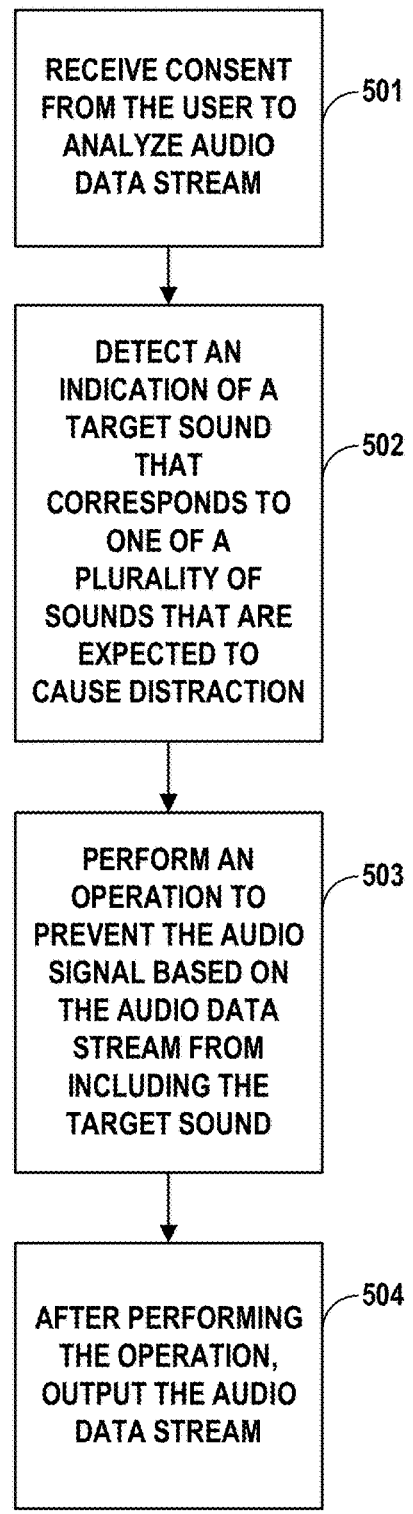
FIG. 5 is a flow diagram illustrating operations performed by an example computing device in accordance with one or more aspects of the present disclosure.

FIG. 5 is a flow diagram illustrating operations performed by an example computing device in accordance with one or more aspects of the present disclosure. FIG. 5 is described below within the context of computing device 200 of FIG. 2. For example, computing device 200 of FIG. 2 may perform operations illustrated in FIG. 5. In other examples, operations illustrated in FIG. 5 may be performed by one or more other components, modules, systems, or devices. Further, in other examples, operations described in connection with FIG. 5 may be merged, performed in a difference sequence, or omitted.

In the example of FIG. 5, computing device 200 may receive consent from the user to analyze an audio data stream (501). For example, particularly in situations where an audio data stream may be sent to a remote system for processing by, for example, detection module 344 of cloud system 300, as described in connection with FIG. 2, computing device 200 may cause user interface module 211 to request permission to process the audio data stream remotely. Computing device 200 may provide a description of the type of processing that may be done remotely, and may describe personal information (e.g., ringtones for a personal phone) that could be transmitted over network 150 and used by cloud system 300. After providing such information, computing device 200 may detect input that computing device 200 determines corresponds to unambiguous and explicit consent to use such information. Computing device 200 might receive such consent periodically (e.g., once a day, once a month, or annually), or in some examples, computing device 200 may receive such consent only once (e.g., upon initial setup of computing device 200). If no such consent is received, computing device 200 may refrain from performing the steps of operations 502-504 until computing device 200 obtains explicit consent.

Computing device 200 may detect, within the audio data stream, an indication of a target sound that corresponds to one of a plurality of sounds that are expected to cause distraction (502). For example, communication unit 212 of computing device 200 may detect input over network 150 that audio processing module 244 determines corresponds to an audio data stream. Audio processing module 244 may apply an audio fingerprint algorithm to match one or more indications of sounds within the audio data stream to indications of sounds stored in sounds data store 254.

Computing device 200 may perform an operation to prevent the audio signal based on the audio data stream from including the target sound (503). For example, audio processing module 244 of computing device 200 may output information about an audio data stream to sound modification module 246. Based on the information from audio processing module 244, sound modification module 246 may modify the audio data stream to replace data associated with the target sound with data associated with a replacement sound.

Computing device 200 may, after performing the adjustment, output the audio data stream (504). For example, computing device 200 may cause user interface module 241 to output an audio signal or audio content corresponding to the modified audio data stream through audio output device 222.

Figure 6:
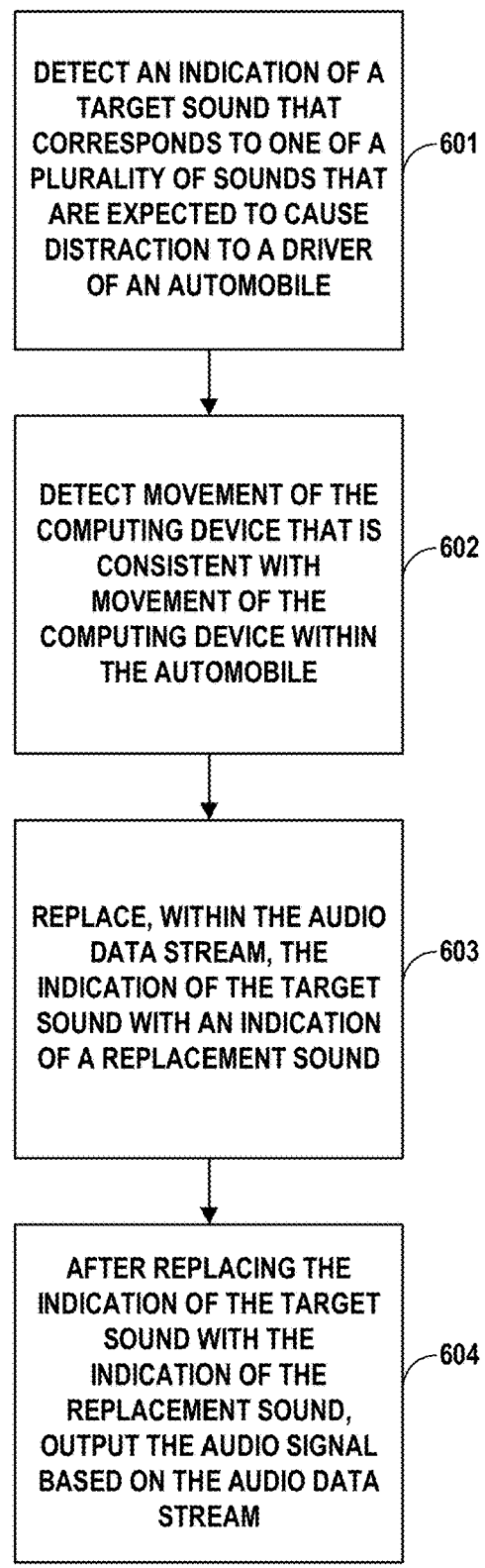
FIG. 6 is an flow diagram illustrating operations performed by an example computing device in an automobile in accordance with one or more aspects of the present disclosure.

FIG. 6 is a flow diagram illustrating operations performed by an example computing device in an automobile in accordance with one or more aspects of the present disclosure. FIG. 6 is described below within the context of computing device 200 of FIG. 1. In other examples, operations described in FIG. 6 may be performed by one or more other components, modules, systems, or devices. Further, in other examples, operations described in connection with FIG. 6 may be merged, performed in a difference sequence, or omitted.

In the example of FIG. 6, computing device 200 may detect, within the audio data stream, an indication of a target sound that corresponds to one of a plurality of sounds that are expected to cause distraction to a driver of an automobile (601). For example, computing device 200 may detect a signal from broadcast tower 110 that audio processing module 244 determines corresponds to an audio data stream derived from a radio broadcast. Audio processing module 244 may apply an audio fingerprint algorithm to match one or more indications of sounds within the audio data stream to indications of sounds stored in sounds data store 254.

Computing device 200 may detect movement of the computing device that is consistent with movement of the computing device within the automobile (602). For example, sensor device 217 of computing device 200 may detect movement that audio processing module 244 determines is consistent with movement within a vehicle traveling along a road.

Computing device 200 may, responsive to detecting movement that is consistent with movement of the computing device within the automobile, replace, within the audio data stream, the indication of the target sound with an indication of a replacement sound, wherein the indication of the replacement sound is a modified version of the indication of the target sound to prevent distraction (603). For example, audio processing module 244 of computing device 200 may determine that the audio data stream includes one or more indications of sounds that match an indication of a sound in sounds data store 254. Audio processing module 244 may output to sound modification module 246 information to sound modification module 246. Sound modification module 246 may modify the audio data stream to replace the data associated with the target sound with data associated with a replacement sound.

Computing device 200 may, after replacing the indication of the target sound with the indication of the replacement sound, output the audio signal based on the audio data stream (604). For example, computing device 200 may cause user interface module 241 to output an audio signal corresponding to the modified audio data stream through audio output device 222.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically might be alternatively not performed automatically, but rather, such operations, acts, steps, or events might be, in some examples, performed in response to input or another event.

Other examples in accordance with one or more aspects of the present disclosure may provide methods of controlling audio reproduction of an audio data stream, such as a broadcast data stream, in a vehicle being driven by a driver, and corresponding apparatus arranged to implement the method. Such apparatus may for example be provided by a portable device such as a smart phone or tablet, or be comprised as part of the electronics built into the vehicle.

Such methods or apparatus may provide monitoring the audio data stream, before reproduction of the audio data stream, to detect matches to sound information, representing audio forms defined in a sounds data store or similar, which may be provided as part of the apparatus or elsewhere. Suitable matching algorithms for carrying out such matching are discussed in more detail herein. Such sounds or audio forms may typically define audio events which would be expected to cause distraction to a driver, such as sounds of car horns or sirens. The methods or apparatus may then modify the matches in the audio data stream in various ways to reduce the likelihood of distraction, before reproducing the audio data stream in the vehicle, to thereby reduce distraction and improve driving safety.

Such methods or apparatus may also provide using one or more sensors, for example of the vehicle or portable device, to determine if movement is consistent with the vehicle currently being driven by the driver. The methods or apparatus may then be arranged to carry out either or both of the above steps of detecting matches and modifying the matches only if such consistent movement is detected, thereby providing arrangements which are more adaptive to the user's current circumstances.

Clause 1. A method comprising: prior to enabling output of an audio signal based on an audio data stream, detecting, by a computing device, within the audio data stream, an indication of a target sound that corresponds to one of a plurality of sounds that are expected to cause distraction; performing, by the computing device, an operation to prevent the audio signal based on the audio data stream from including the target sound; and after performing the operation, outputting, by the computing device, the audio data stream.

Clause 2. The method of any other clause, including clause 1, wherein performing the operation comprises replacing, within the audio data stream, the indication of the target sound with an indication of a replacement sound, wherein the replacement sound is a less distracting version of the target sound; and wherein outputting the audio data stream includes outputting, by the computing device, the audio signal based on the audio data stream.

Clause 3. The method of any other clause, including clause 1, wherein performing the operation comprises adjusting an audio output device so that the audio signal corresponding to the indication of the target sound does not sound like the target sound when output using the audio output device; and wherein outputting the audio data stream includes outputting, by the computing device, through the audio output device, the audio signal based on the audio data stream.

Clause 4. The method of any other clause, including clause 2, further comprising: determining, by the computing device, a context in which the computing device is being used; and determining at least one of the plurality of sounds that are expected to cause distraction based at least on the context in which the computing device is being used.

Clause 5. The method of any other clause, including clause 4, wherein the context in which the computing device is being used is based on at least one of: information about a sound that may be outputted by another device within the vicinity of the computing device; information derived from movement detected by the computing device; and information derived from a location detected by the computing device.

Clause 6. The method of any other clause, including clause 1, wherein performing the operation comprises replacing, within the audio data stream, the indication of the target sound with an indication of a replacement sound, wherein the indication of the replacement sound is a modified version of the indication of the target sound to prevent distraction; wherein outputting the audio data stream includes outputting, by the computing device, over a network, to a remote device, the audio data stream; and wherein the method further comprises: determining, by the computing device, a context in which the remote device is being used, and determining the plurality of sounds that are expected to cause distraction based at least on the context in which the remote device is being used.

Clause 7. The method of any other clause, including clause 6, wherein the context in which the remote device is being used is based on at least one of: information about a sound that may be outputted by another device within the vicinity of the remote device; information about a sound that may be outputted by the remote device; information derived from movement detected by the remote device; and information derived from a location detected by the remote device.

Clause 8. The method of any other clause, including clause 1, further comprising: monitoring the audio data stream to detect the indication of the target sound during a window of time sufficient to recognize any one of the plurality of sounds that are expected to cause distraction; and wherein outputting the audio data stream includes outputting the audio data stream delayed by at least the window of time.

Clause 9. The method of any other clause, including clause 1, wherein the replacement sound is different than the target sound, but wherein the replacement sound is recognizable as representing the target sound.

Clause 10. A computing system comprising: at least one processor; and at least one storage device that stores instructions that, when executed, configure the at least one processor to: prior to enabling output of an audio signal based on an audio data stream, detect, within the audio data stream, an indication of a target sound that corresponds to one of a plurality of sounds that are expected to cause distraction, replace, within the audio data stream, the indication of the target sound with an indication of a replacement sound, wherein the indication of the replacement sound is a modified version of the indication of the target sound to prevent distraction, and after replacing the indication of the target sound with the indication of the replacement sound, output the audio data stream.

Clause 11. The computing system of any other clause, including clause 10, wherein outputting the audio data stream includes outputting, by the computing device, the audio signal based on the audio data stream, and wherein the instructions, when executed, further configure the at least one processor to: determine a context in which the computing device is being used; and determine the plurality of sounds that are expected to cause distraction based at least on the context in which the computing device is being used.

Clause 12. The computing system of any other clause, including clause 11, wherein the context in which the computing device is being is based on at least one of: information about a sound that may be outputted by another device within the vicinity of the computing device; information derived from movement detected by the computing device; and information derived from a location detected by the computing device.

Clause 13. The computing system of any other clause, including clause 10, wherein outputting the audio data stream includes outputting, by the computing device, over a network, to a remote device, the audio data stream, and wherein the instructions, when executed, further configure the at least one processor to: determine, by the computing device, a context in which the remote device is being used; and determine the plurality of sounds that are expected to cause distraction based at least on the context in which the remote device is being used.

Clause 14. The computing system of any other clause, including clause 13, wherein the context in which the remote device is being used is based on at least one of: information about a sound that may be outputted by another device within the vicinity of the remote device; information about a sound that may be outputted by the remote device; information derived from movement detected by the remote device; and information derived from a location detected by the remote device.

Clause 15. The computing system of any other clause, including clause 10, wherein the instructions, when executed, further configure the at least one processor to: monitor the audio data stream to detect the indication of the target sound during a window of time sufficient to recognize any one of the plurality of sounds that are expected to cause distraction; and wherein outputting the audio data stream includes outputting the audio data stream delayed by at least the window of time.

Clause 16. The computing system of any other clause, including clause 10, wherein the replacement sound is different than the target sound, but wherein the replacement sound is recognizable as representing the target sound.

Clause 17. The computing system of any other clause, including clause 10, wherein the replacement sound is a tone-shifted version of the target sound.

Clause 18. The computing system of any other clause, including clause 10, wherein the audio data stream is generated by at least one of: an in-automobile audio broadcast, a phone conversation, a television broadcast, and a computing device possessed by a user.

Clause 19. A computer-readable storage medium comprising instructions that, when executed, configure at least one processor of a computing system to: prior to outputting an audio signal based on an audio data stream, detect, within the audio data stream, an indication of a target sound that corresponds to one of a plurality of sounds that are expected to cause distraction to a driver of an automobile; detect movement of the computing device that is consistent with movement of the computing device within the automobile; responsive to detecting movement that is consistent with movement of the computing device within the automobile, replace, within the audio data stream, the indication of the target sound with an indication of a replacement sound, wherein the indication of the replacement sound is a modified version of the indication of the target sound to prevent distraction; and after replacing the indication of the target sound with the indication of the replacement sound, output the audio signal based on the audio data stream.

Clause 20. The computer-readable storage medium of any other clause, including clause 19, wherein the instructions, when executed, further configure the at least one processor to: determine a context in which the computing system is being used; and determine the plurality of sounds that are expected to cause distraction based at least on the context in which the computing system is being used.

Clause 21. A system comprising means for performing any of the methods of any prior clause.

Clause 22. A computing device comprising means for performing any of the methods of any prior clause.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Although certain modules, data stores, components, programs, executables, data items, functional units, and/or other items included within one or more storage devices may have been illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

What is claimed is:

1. A method comprising:
    prior to enabling output of an audio signal based on an audio data stream, detecting, by a computing device, within the audio data stream, an indication of a target sound that corresponds to one of a plurality of sounds that are expected to cause distraction;
    determining, by the computing device, whether movement of the computing device is consistent with movement of an automobile;
    responsive to determining that the movement of the computing device is consistent with the movement of the automobile, performing, by the computing device, an operation to prevent the audio signal based on the audio data stream from including the target sound; and
    after performing the operation, outputting, by the computing device, the audio data stream.

2. The method of claim 1,
    wherein performing the operation comprises replacing, within the audio data stream, the indication of the target sound with an indication of a replacement sound, wherein the replacement sound is a less distracting version of the target sound; and
    wherein outputting the audio data stream includes outputting, by the computing device, the audio signal based on the audio data stream.

3. The method of claim 1,
    wherein performing the operation comprises adjusting an audio output device so that the audio signal corresponding to the indication of the target sound does not sound like the target sound when output using the audio output device; and
    wherein outputting the audio data stream includes outputting, by the computing device, through the audio output device, the audio signal based on the audio data stream.

4. The method of claim 2, further comprising:
    determining, by the computing device, a context in which the computing device is being used; and determining at least one of the plurality of sounds that are expected to cause distraction based at least on the context in which the computing device is being used.

5. The method of claim 4, wherein the context in which the computing device is being used is based on at least one of:
information about a sound another device within the vicinity of the computing device is configured to output;
information derived from the movement of the computing device; or
information derived from a location of the computing device.

6. The method of claim 1,
wherein performing the operation comprises replacing, within the audio data stream, the indication of the target sound with an indication of a replacement sound, wherein the indication of the replacement sound is a modified version of the indication of the target sound to prevent distraction;
wherein outputting the audio data stream includes outputting, by the computing device, over a network, to a remote device, the audio data stream; and
wherein the method further comprises:
determining, by the computing device, a context in which the remote device is being used, and
determining the plurality of sounds that are expected to cause distraction based at least on the context in which the remote device is being used.

7. The method of claim 6, wherein the context in which the remote device is being used is based on at least one of:
information about a sound another device within the vicinity of the remote device is configured to output;
information about a sound the remote device is configured to output;
information derived from movement of the remote device; or
information derived from a location of the remote device.

8. The method of claim 1, further comprising:
monitoring the audio data stream to detect the indication of the target sound during a window of time sufficient to recognize any one of the plurality of sounds that are expected to cause distraction,
wherein outputting the audio data stream includes outputting the audio data stream delayed by at least the window of time.

9. The method of claim 1, wherein the replacement sound is different than the target sound, and wherein the replacement sound is recognizable as representing the target sound.

10. A computing device comprising:
at least one processor; and
at least one storage device that stores instructions that, when executed, configure the at least one processor to:
prior to enabling output of an audio signal based on an audio data stream, detect, within the audio data stream, an indication of a target sound that corresponds to one of a plurality of sounds that are expected to cause distraction,
determine whether movement of the computing device is consistent with movement of an automobile;
responsive to determining that the movement of the computing device is consistent with the movement of the automobile, replace, within the audio data stream, the indication of the target sound with an indication of a replacement sound, wherein the indication of the replacement sound is a modified version of the indication of the target sound to prevent distraction, and
after replacing the indication of the target sound with the indication of the replacement sound, output the audio data stream.

11. The computing device of claim 10, wherein the instructions, when executed, configure the at least one processor to output the audio data stream by at least configuring the at least one processor to output the audio signal based on the audio data stream, and wherein the instructions, when executed, further configure the at least one processor to:
determine a context in which the computing device is being used; and
determine the plurality of sounds that are expected to cause distraction based at least on the context in which the computing device is being used.

12. The computing device of claim 11, wherein the context in which the computing device is being is based on at least one of:
information about a sound another device within the vicinity of the computing device is configured to output;
information derived from the movement of the computing device; or
information derived from a location of the computing device.

13. The computing device of claim 10, wherein the instructions, when executed, configure the at least one processor to output the audio data stream by at least configuring the processor to output, over a network, to a remote device, the audio data stream, and wherein the instructions, when executed, further configure the at least one processor to:
determine, by the computing device, a context in which the remote device is being used; and
determine the plurality of sounds that are expected to cause distraction based at least on the context in which the remote device is being used.

14. The computing device of claim 13, wherein the context in which the remote device is being used is based on at least one of:
information about a sound another device within the vicinity of the remote device is configured to output;
information about a sound the remote device is configured to output;
information derived from movement of the remote device; and
information derived from a location of the remote device.

15. The computing device of claim 10, wherein the instructions, when executed, further configure the at least one processor to:
monitor the audio data stream to detect the indication of the target sound during a window of time sufficient to recognize any one of the plurality of sounds that are expected to cause distraction,
wherein outputting the audio data stream includes outputting the audio data stream delayed by at least the window of time.

16. The computing device of claim 10, wherein the replacement sound is different than the target sound, and wherein the replacement sound is recognizable as representing the target sound.

17. The computing device of claim 10, wherein the replacement sound is a tone-shifted version of the target sound.

18. The computing device of claim 10, wherein the audio data stream is generated by at least one of:
an in-automobile audio broadcast, a phone conversation, a television broadcast, or a computing device associated with a user of the computing device.

19. A computer-readable storage medium comprising instructions that, when executed, configure at least one processor of a computing device to:
prior to outputting an audio signal based on an audio data stream, detect, within the audio data stream, an indication of a target sound that corresponds to one of a plurality of sounds that are expected to cause distraction to a driver of an automobile;
detect movement of the computing device that is consistent with movement of the computing device within the automobile;
responsive to detecting movement that is consistent with movement of the computing device within the automobile, replace, within the audio data stream, the indication of the target sound with an indication of a replacement sound, wherein the indication of the replacement sound is a modified version of the indication of the target sound to prevent distraction; and
after replacing the indication of the target sound with the indication of the replacement sound, output the audio signal based on the audio data stream.

20. The computer-readable storage medium of claim 19, wherein the instructions, when executed, further configure the at least one processor to:
determine a context in which the computing device is being used; and
determine the plurality of sounds that are expected to cause distraction based at least on the context in which the computing device is being used.

* * * * *